US009806824B2

United States Patent
Nakahara et al.

(10) Patent No.: US 9,806,824 B2
(45) Date of Patent: Oct. 31, 2017

(54) WIRELESS POWER SUPPLY RECEIVER-TRANSMITTER DEVICE, WIRELESS POWER SUPPLY RECEIVER AND WIRELESS POWER SUPPLY TRANSMITTER

(71) Applicant: ROHM CO., LTD., Kyoto (JP)

(72) Inventors: Ken Nakahara, Kyoto (JP); Masayuki Kitagawa, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 136 days.

(21) Appl. No.: 14/038,174

(22) Filed: Sep. 26, 2013

(65) Prior Publication Data
US 2014/0086592 A1 Mar. 27, 2014

(30) Foreign Application Priority Data
Sep. 26, 2012 (JP) .................................. 2012-212139

(51) Int. Cl.
*H04B 10/00* (2013.01)
*H04B 5/00* (2006.01)
(Continued)

(52) U.S. Cl.
CPC ............ *H04B 10/807* (2013.01); *H02J 5/005* (2013.01); *H04B 5/0037* (2013.01); *H04B 5/0031* (2013.01); *H04B 10/40* (2013.01)

(58) Field of Classification Search
None
See application file for complete search history.

(56) References Cited

U.S. PATENT DOCUMENTS 3,825,896 A * 7/1974 Obenhaus ............ H04B 10/802
250/551
4,956,877 A * 9/1990 Kroll .................. H04B 10/2587
398/141
(Continued)

FOREIGN PATENT DOCUMENTS

JP 2001223341 A 8/2001
JP 2004064938 A 2/2004
(Continued)

OTHER PUBLICATIONS http://emol.org/videoipod.*
(Continued)

*Primary Examiner* — Ken N Vanderpuye
*Assistant Examiner* — Jai Lee
(74) *Attorney, Agent, or Firm* — Cantor Colburn LLP

(57) ABSTRACT

There is provided a power supply receiver-transmitter device, a wireless power supply receiver, and a wireless power supply transmitter which allow wireless power supply transmission and wireless data transmission and reception, and improve the usability thereof. The wireless power supply receiver-transmitter device includes: a wireless power supply receiver (PR) including a power receiver unit (RU) and a first data transmitter/receiver unit (DRU); a wireless power supply transmitter (PT) including a power transmitter unit (TU); and a second data transmitter/receiver unit (DTU). The wireless power supply receiver (PR) wirelessly receives electric power transmitted from the wireless power supply transmitter (PT), and the first data transmitter/receiver unit (DRU) bidirectionally transmits and receives data to/from the second data transmitter/receiver units (DTU) through optical communications.

23 Claims, 28 Drawing Sheets

(51) Int. Cl.
*H04B 10/80* (2013.01)
*H02J 5/00* (2016.01)
*H04B 10/40* (2013.01)

(56) References Cited

U.S. PATENT DOCUMENTS

| | | | | |
|---|---|---|---|---|
| 8,621,126 | B2* | 12/2013 | Sueyoshi | H04B 5/0031 455/41.1 |
| 8,805,456 | B1* | 8/2014 | Hardy | H02J 7/025 455/41.1 |
| 8,890,470 | B2* | 11/2014 | Partovi | H01F 7/0252 320/108 |
| 2007/0228833 | A1* | 10/2007 | Stevens | H02J 5/005 307/45 |
| 2010/0068996 | A1* | 3/2010 | Haartsen | H04B 5/0025 455/41.1 |
| 2010/0080563 | A1* | 4/2010 | DiFonzo et al. | 398/115 |
| 2010/0311327 | A1* | 12/2010 | Hamada | H02J 7/025 455/41.1 |
| 2011/0050164 | A1* | 3/2011 | Partovi | H01F 5/003 320/108 |
| 2011/0057606 | A1* | 3/2011 | Saunamaki | H02J 7/025 320/108 |
| 2011/0285212 | A1 | 11/2011 | Higuma et al. | |
| 2013/0084800 | A1* | 4/2013 | Troberg | H04B 5/0037 455/41.1 |
| 2013/0236192 | A1* | 9/2013 | Deicke | G06F 1/1632 398/135 |
| 2014/0086586 | A1* | 3/2014 | Voutilainen | H04M 1/003 398/115 |

FOREIGN PATENT DOCUMENTS

| | | |
|---|---|---|
| JP | 2008182858 A | 8/2008 |
| JP | 2010016977 A | 1/2010 |
| JP | 2010115035 A | 5/2010 |
| JP | 2010252624 A | 11/2010 |
| JP | 2011509645 A | 3/2011 |
| JP | 2012100390 A | 5/2012 |
| JP | 2012143091 A | 7/2012 |
| JP | 2012147610 A | 8/2012 |
| JP | 2012518382 A | 8/2012 |
| WO | 2006022365 A1 | 3/2006 |
| WO | 2012055706 A1 | 5/2012 |

OTHER PUBLICATIONS

Wu et al., Wireless Ad Hoc Networking: Personal-Area, Local-Area, and the Sensory-Area Networks, 2007, Taylor & Francis Group, pp. 193-195.*
Shur et al., Adanced High Speed Devices, 2010, World Scientific Publishing Co., p. 121.*
Solar Energy International, Photovoltaics: Design and Installation Manual, 2004, Solar Energy International, p. 74.*
Chitode, Digital Signal Processing, 2008, Technical Publications Pune, p. 405.*
Bhattacharya, Basic Electrical and Electronics Engineering, 2011, Pearson Education India, pp. 712, 715.*
Zargham et al., Maximum Achievable Efficiency in Near-Field Coupled Power-Transfer Systems, Jun. 2012, IEEE Transactions on Biomedical Circuits and Systmes, vol. 6, No. 3.*
"Efficient wireless non-radiative mid-range energy transfer"; Authors: Aristeidis Karalis, J.D. Joannopoulos, Marin Soljacic; Elsevier; Annals of Physics; Available online at www.sciencedirect.com—Annal of Physics 323 (2008) 34-48; 15 pgs.

* cited by examiner

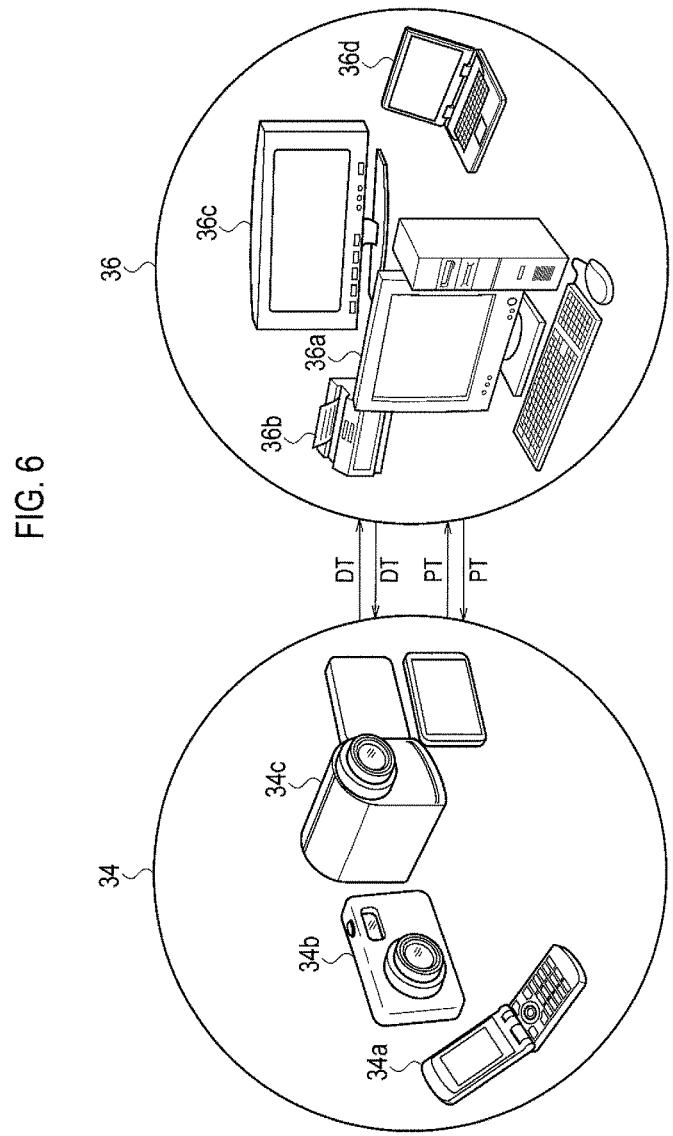

WIRELESS POWER SUPPLY RECEIVER-TRANSMITTER DEVICE, WIRELESS POWER SUPPLY RECEIVER AND WIRELESS POWER SUPPLY TRANSMITTER

CROSS REFERENCE TO RELATED APPLICATIONS

This application is based upon and claims the benefit of priority from prior Japanese Patent Application No. 2012-212139 filed on Sep. 26, 2012, the entire contents of which are incorporated herein by reference.

TECHNICAL FIELD

The present invention relates to a wireless power supply receiver-transmitter device, a wireless power supply receiver, and a wireless power supply transmitter.

BACKGROUND ART

There is disclosed a non-contact power supply transmitter system for supplying electric power to mobile electronic devices, e.g. mobile phones, notebook computers, digital still cameras, electronic toys, in a noncontact manner (for example, refer to Patent Literature 1.). Since such a non-contact power supply transmitter system does not need to connect a charger adapter with a mobile device via a cable etc., thereby reducing frequently-used connectors, it can reduce hardware failures due to physical contact, and is excellent in waterproofness thereof.

Moreover, there is disclosed an example of a wireless transmission of resonant strong magnetic coupling based on an experiment example in the Massachusetts Institute of Technology (MIT) (for example, refer to Non Patent Literature 1.). In this example, resonant strong magnetic coupling by opposing a primary-side coil and a secondary-side coil each of which the diameter is approximately 60 cm to each other, keeping a distance R=2.1 m (7 feet), can achieve 40-percent improvement in transmitting efficiency.

CITATION LIST

Patent Literature 1: Japanese Patent Application Laying-Open Publication No. 2012-143091
Non-Patent Literature 1: Aristeidis Karalis, J. D. Joannopoulos, and Marin Soljacic, "Efficient wireless non-radiative mid-range energy transfer", Available online at www.sciencedirect.com, ScienceDirect, Annals of Physics 323 (2008) 34-48, doi:10.1016/j.aop.2007.04.017

SUMMARY OF THE INVENTION

Technical Problem

However, when data communications are a cable communications even if power supply transmission is in a noncontact manner, or conversely when data communications are a wireless communications even if power supply transmission is in a contact or connection manner, perfectly connectorless transmission cannot be achieved in the whole of device. Accordingly, it is hard to say that there have been generated new values as perfectly elimination of hardware failures due to physical contact, and excellent waterproofness. Moreover, higher data transmission rate is required for data communications in recent years, and high levels of performance are also required therefor in respect of noise immunity and security.

The object of the present invention is to provide a wireless power supply receiver-transmitter device, a wireless power supply receiver, and a wireless power supply transmitter which allow wireless power supply transmission and wireless data transmission and reception, and improve the usability thereof wirelessly.

Solution to Problem

According to one aspect of the present invention for achieving the above-mentioned object, there is provided a wireless power supply receiver-transmitter device comprising: a wireless power supply receiver including a power receiver unit and a first data transmitter/receiver unit; a wireless power supply transmitter including a power transmitter unit; and a second data transmitter/receiver unit, wherein the wireless power supply receiver wirelessly receives electric power transmitted from the wireless power supply transmitter, and the first data transmitter/receiver unit transmits and receives data bidirectionally to/from the second data transmitter/receiver unit.

According to another aspect of the present invention, there is provided a wireless power supply receiver comprising: a power receiver unit configured to wirelessly receive electric power transmitted from a wireless power supply transmitter; and a first data transmitter/receiver unit configured to bidirectionally transmit and receive data through the optical communications to/from the wireless power supply transmitter.

According to still another aspect of the present invention, there is provided a wireless power supply transmitter comprising: a power transmitter unit configured to wirelessly transmit an electric power to a wireless power supply receiver; and a second data transmitter/receiver unit configured to bidirectionally transmit and receive data through optical communications to/from the wireless power supply receiver.

Advantageous Effects of Invention

According to the present invention, there can be provided a wireless power supply receiver-transmitter device, a wireless power supply receiver, and a wireless power supply transmitter which allow wireless power supply transmission and wireless data transmission and reception, and improve the usability thereof wirelessly.

BRIEF DESCRIPTION OF DRAWINGS

FIG. 6 is a diagram for explaining an example of combination of devices composing the wireless power supply receiver-transmitter device according to the embodiment.

DESCRIPTION OF EMBODIMENTS

Figure 1A:
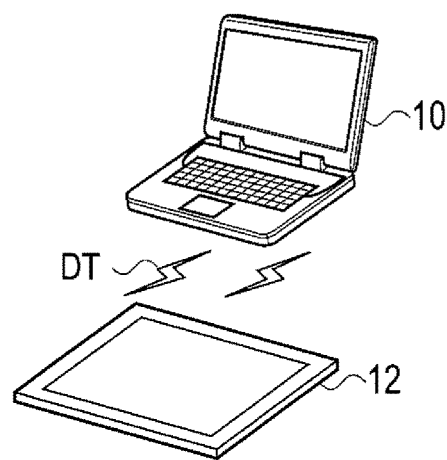
FIG. 1A is a diagram showing a schematic bird's-eye view configuration showing an overview of a wireless power supply receiver-transmitter device according an embodiment, and showing an aspect that a data transmission is executed.

Next, certain embodiment of the invention will be described with reference to drawings. In the description of the following drawings, the identical or similar reference numeral is attached to the identical or similar part. However, it should be noted that the drawings are schematic and the relation between thickness and the plane size and the ratio of the thickness of each layer differs from an actual thing. Therefore, detailed thickness and size should be determined in consideration of the following explanation. Of course, the part from which the relation and ratio of a mutual size differ also in mutually drawings is included.

Moreover, the embodiment shown hereinafter exemplify the apparatus and method for materializing the technical idea of the present invention; and the embodiments of the present invention does not specify the material, shape, structure, placement, etc. of component parts as the following. Various changes can be added to the technical idea of the present invention in scope of claims.

In the following descriptions, wording "non-contact" is expressed as "wireless" for the purpose of unifying the designation.

Embodiment

Hereinafter, there will be explained a wireless power supply receiver-transmitter device according to an embodiment with reference to FIGS. 1-40.

The wireless power supply receiver-transmitter device 1 according to the embodiment includes: a wireless power supply receiver (PR) 62 including a power receiver unit (RU) 66 and a first data transmitter/receiver unit (DRU) 72; a wireless power supply transmitter (PT) 60 including a power transmitter unit (TU) 64; and a second data transmitter/receiver unit (DTU) 70. The wireless power supply receiver (PR) 62 wirelessly receives electric power transmitted from the wireless power supply transmitter (PT) 60, and the first data transmitter/receiver unit (DRU) 72 bidirectionally transmits and receives data to/from the second data transmitter/receiver unit (DTU).

In this case, the first data transmitter/receiver unit (DRU) 72 may be configured to operate with the power supply from the wireless power supply transmitter (PT) 60.

Moreover, the first data transmitter/receiver unit (DRU) 72 may be configured to bidirectionally transmit and receive through optical communications to/from the second data transmitter/receiver unit (DTU) 70.

Moreover, the wireless power supply transmitter (PT) 60 may include a second data transmitter/receiver unit (DTU) 70.

Moreover, the wireless power supply transmitter (PT) 60 may transmit image data displayed on the wireless power supply receiver (PR) 62 from the first data transmitter/receiver unit (DRU) 72 to the second data transmitter/receiver unit (DTU) 70 through the optical communications. Since radiation of electromagnetic waves may simultaneously occur, it is preferred for the data communications to use the optical communications which is unsusceptible to noise.

Moreover, the image data may also include a still image and a moving image.

Moreover, the image data may be downloaded in the first data transmitter/receiver unit (DRU) 72 over the Internet.

Moreover, the wireless power supply receiver (PR) 62 may be built in a mobile phone 34a, a digital still camera 34b, a video camera 34c, a tablet-type device, and/or an electric vehicle 78.

Moreover, the wireless power supply transmitter (PT) 60 may be built in a desktop computer 36a, a printer 36b, a television set 36c, a notebook computer 10, a docking station 38, a server, and/or a plug-in station for electric vehicles.

Moreover, the first data transmitter/receiver unit (DRU) 72 and the second data transmitter/receiver unit (DTU) 70 may include laser link modules 18a, 18b including a laser diode 22 and a PIN photodiode 24.

Moreover, gallium nitride based field effect transistors Q1, Q2 may be used in the power transmitter unit (TU) 64 as switching devices.

Moreover, a switching frequency of the switching device may be equal to or greater than 5 MHz.

If coupling between the power transmitter unit (TU) 64 and the power receiver unit (RU) 66 deviated from the stationary state more than a certain amount, the wireless power supply transmitter (PT) 60 may detect the state to terminate the power transmission of electric power.

Moreover, a laser beam in the wavelength region of equal to or greater than 800 nm may be used for the optical communications.

Moreover, a communication rate of the optical communications may be greater than 1 Gbps.

Moreover, if the wireless power supply receiver (PR) 62 receives excess power from the wireless power supply transmitter (PT) 60, the wireless power supply receiver (PR) 62 may feed the excess power to a resistor to be converted into a heat. Alternatively, a battery may be provided in the power supply receiver side so that the excess power may be charged to the battery.

Moreover, the wireless power supply receiver (PR) 62 may notify a predetermined voltage value (for example, a value of the voltage Vo) to the wireless power supply transmitter (PT) 60 through the optical communications, and then the wireless power supply transmitter (PT) 60 may control the amount of the power to be transmitted in accordance with the voltage value notified from the wireless power supply receiver (PR) 62.

Moreover, the optical communications may be implemented with a space transmission.

Moreover, the optical communications may be implemented with an optical fiber transmission.

The wireless power supply receiver (PR) 62 according to the embodiment includes: a power receiver unit (RU) 66 configured to wirelessly receive electric power transmitted from the wireless power supply transmitter (PT) 60, and a first data transmitter/receiver unit (DRU) 72 configured to bidirectionally transmit and receive data through the optical communications to/from the wireless power supply transmitter (PT) 60.

In this case, the power receiver unit (RU) 66 may include: a secondary-side coil 16; a secondary-side resonance capacitor C3 connected to the secondary-side coil 16, and configured to be tuned with the secondary-side coil 16 in a predetermined wireless power transmission carrier frequency band; and a diode bridge circuit DB connected to the secondary-side resonance capacitor C3.

The wireless power supply transmitter (PT) 60 according to the embodiment includes: a power transmitter unit (TU) 64 configured to wirelessly transmit electric power to the power supply receiver (PR) 62; and a second data transmitter/receiver unit (DTU) 70 configured to bidirectionally transmit and receive data through the optical communications to/from the wireless power supply receiver (PR) 62.

In this case, the power transmitter unit (TU) 64 may include: an oscillating circuit (OSC) 86; a gate driver (GDR) 84 connected to the OSC 86; a half bridge circuit (field effect transistors Q1, Q2) connected to the GDR 84; a low pass filter (L, C1) connected to the half bridge circuit; a primary-side resonance capacitor C2 connected to the low pass filter (L, C1); and a primary-side coil 14 (L1) connected to the primary-side resonance capacitor C2, and configured to be tuned with the primary-side resonance capacitor C2 in a predetermined wireless power transmission carrier frequency band.

(Overview)

Figure 1B:
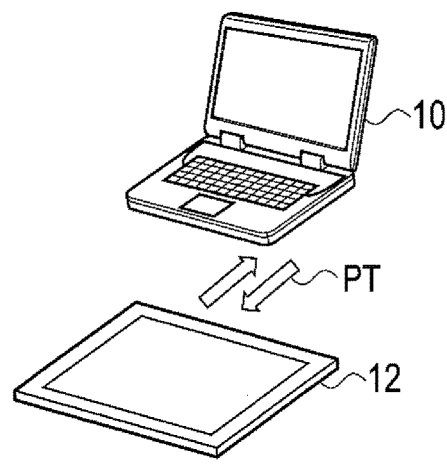
FIG. 1B is a diagram showing a schematic bird's-eye view configuration showing an overview of the wireless power supply receiver-transmitter device according to the embodiment, and showing an aspect that a power transmission is executed.
Figure 1C:
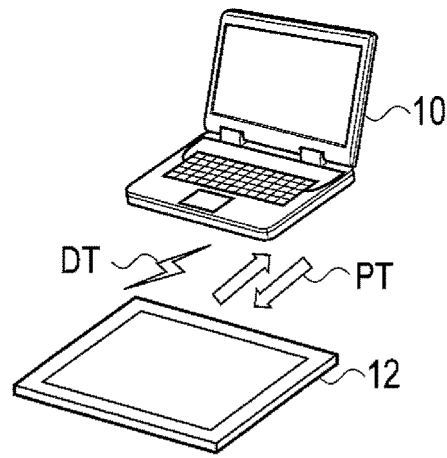
FIG. 1C is a diagram showing an aspect that both of the data transmission and the power transmission are executed.

FIG. 1A illustrates a schematic bird's-eye view configuration showing an overview of the wireless power supply receiver-transmitter device according to the embodiment. That is, FIG. 1A shows an aspect that data transmission DT is wirelessly executed through the optical communications (fiber less) between the wireless charger 12 and the notebook computer 10. Moreover, FIG. 1B shows an aspect that power transmission PT is wirelessly executed between the wireless charger 12 and the notebook computer 10. The wireless power supply receiver-transmitter device according to the present embodiment can achieve both of the wireless data transmission DT and the wireless power transmission PT, as shown in FIG. 1C. Herein, the wireless device in the power receiver side on which the power transmission PT is executed is referred to the "wireless power supply receiver (PR) 62" and the wireless device in the power transmission side on which the power transmission PT is executed is referred to the "wireless power supply transmitter (PT) 60."

(Power Transmission)

Figure 2:
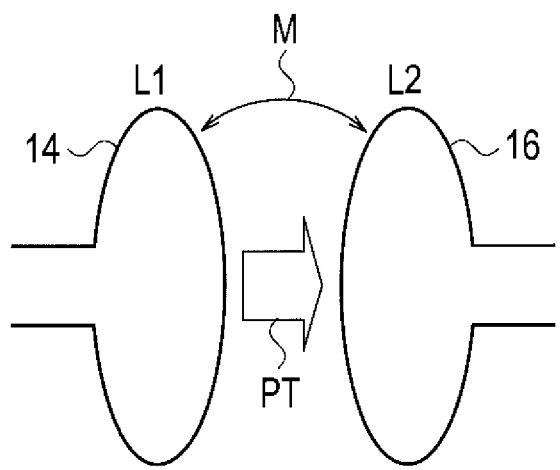
FIG. 2 is a diagram for explaining the power transmission executed in the wireless power supply receiver-transmitter device according to the embodiment.

First, there will be explained the power transmission PT through the power transmission executed in the wireless power supply receiver-transmitter device according to the embodiment. As shown in FIG. 2, the power transmission PT through the power transmission is executed using electromagnetic coupling between the primary-side (power transmission side) coil 14 and the secondary-side (power receiver side) coil 16.

Figure 3:
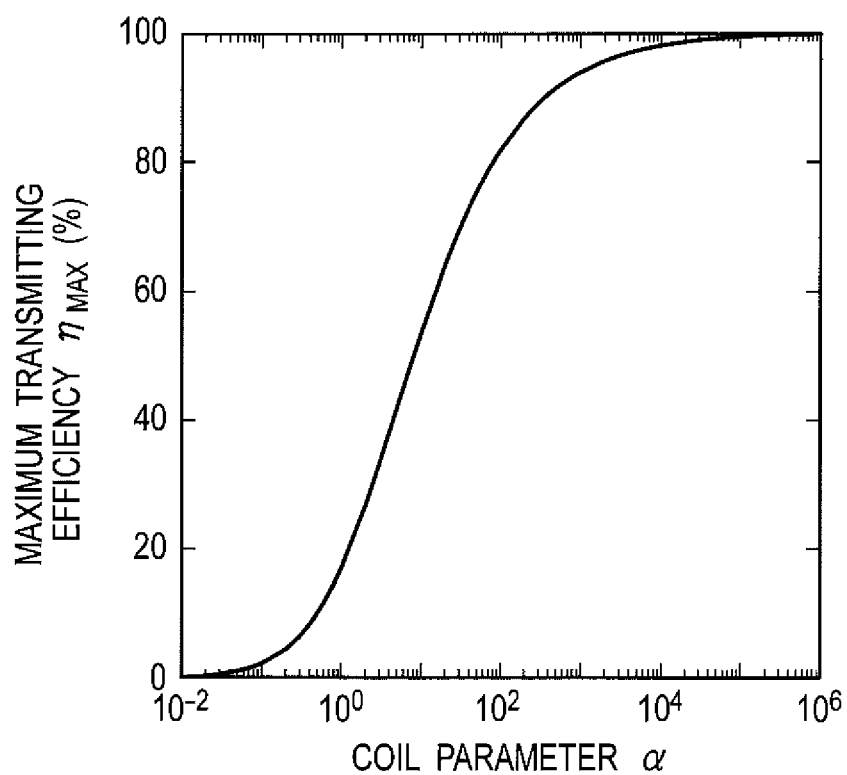
FIG. 3 is a graph showing a relationship between a coil parameter and maximum transmitting efficiency in the wireless power supply receiver-transmitter device according to the embodiment.

FIG. 3 illustrates a graph showing a relationship between a coil parameter α and maximum transmitting efficiency $\eta_{MAX}$ through the power transmission, in the wireless power supply receiver-transmitter device according to the embodiment.

Values $Q_1$ and $Q_2$ of quality factor (Q) of the primary-side coil 14 and the secondary-side coil 16 are expressed with the following equations (1) and (2):

$$Q_1 = \omega L1/r_1 \quad (1)$$

$$Q_2 = \omega L2/r_2 \quad (2)$$

where L1 is an inductance of the primary-side coil 14, $r_1$ is series resistance, $L_2$ is an inductance of the secondary-side coil 16, and r2 is series resistance.

Moreover, the coil parameter α is expressed with the following equation (3), and the maximum transmitting efficiency $\eta_{MAX}$ is expressed with the following equation (4):

$$\alpha = k^2 Q_1 Q_2 \quad (3)$$

$$\eta_{MAX} = \alpha/[1+(1+\alpha)^{1/2}]^2 \quad (4)$$

where M is a mutual inductance between the primary-side coil 14 and the secondary-side coil 16.

In this case, k is a coupling factor between the primary-side coil 14 and the secondary-side coil 16. That is, as shown in FIG. 3, the coil parameter α through the power transmission governs the maximum transmitting efficiency $\eta_{MAX}$, and, the maximum transmitting efficiency $\eta_{MAX}$ becomes approximately 100% as the coil parameter α becomes equal to or greater than approximately $10^4$. In order to increase the value of the coil parameter α, it is preferred to increase the frequency ω from a form of the equation ωL/r indicating the Q value of the coil. There is also a way to increase the inductance value L of the coil in order to increase the value of the coil parameter α. However, since the coil becomes larger according to such a way, it is not preferred in particular for devices of which the feature is "small size", e.g., mobile computing devices. If the switching device (field effect transistors Q1, Q2) in the power transmitter unit (TU) 64 is composed of silicon, it is difficult to increase the frequency ω. Accordingly, in the present embodiment, such field effect transistors Q1, Q2 are composed of gallium nitride (GaN) based materials. Accordingly, since the frequency ω can be increased compared with the case where the silicon is used, the value of the coil parameter α can be increased, thereby improving the maximum transmitting efficiency $\eta_{MAX}$.

(Configuration Example of Laser Link Module)

Figure 4A:
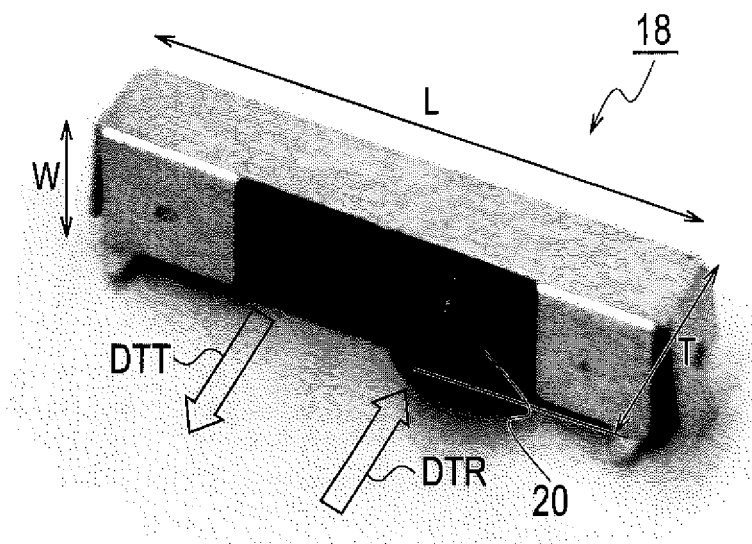
FIG. 4A is a schematic bird's-eye view configuration diagram which is an example of an external photograph showing a laser link module in a data transmitter/receiver device used in the wireless power supply receiver-transmitter device according to the embodiment.
Figure 4B:
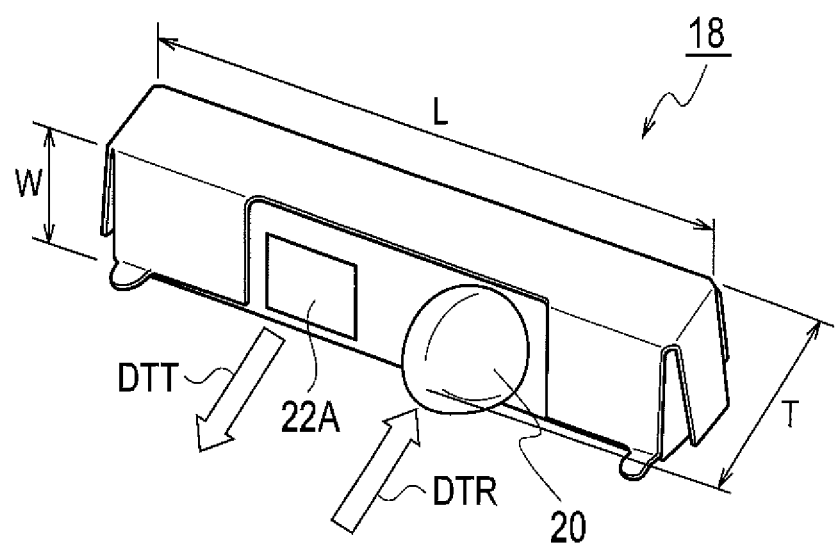
FIG. 4B is a schematic bird's-eye view configuration diagram which is an explanatory diagram corresponding to FIG. 4A showing the laser link module in the data transmitter/receiver device used in the wireless power supply receiver-transmitter device according to the embodiment.

FIGS. 4A and 4B illustrate schematic bird's-eye view configurations of the laser link module 18 used in the wireless power supply receiver-transmitter device according to the embodiment. FIG. 4A shows an example of a photograph, and FIG. 4B is an explanatory diagram corresponding to FIG. 4A. As shown in FIGS. 4A and 4B, the laser link module 18 is formed in an approximately rectangular solid shape, and includes a light emitting unit 22A and a lens 20 on a front surface thereof. A laser beam is emitted from the light emitting unit 22A to transmit the transmitting data DTT, and the laser beam is focused on the lens 20 to receive the data DTR. As the size of the laser link module 18, the length L is approximately 6 mm to approximately 12 mm, the width W is approximately 0.5 mm to approximately 3 mm, and the thickness T is approximately 3 mm to approximately 10 mm, for example.

Figure 5:
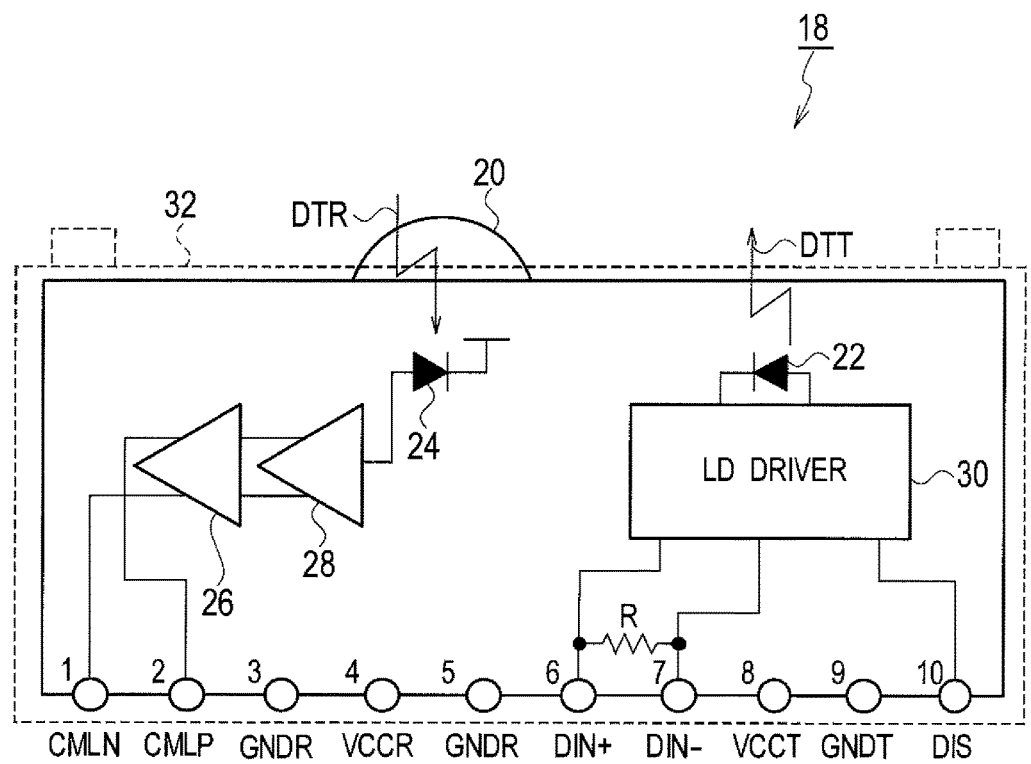
FIG. 5 is a schematic circuit block configuration diagram of the laser link module shown in FIGS. 4A and 4B.

FIG. 5 illustrates a schematic circuit block configuration of the laser link module 18 shown in FIG. 4. As shown in FIG. 5, a shielding case 32 shields a laser diode 22, a PIN photodiode 24, a limiting amplifier 26, a transimpedance amplifier 28, and an LD driver 30, and the laser link module 18 has a configuration in which the optical communications bidirectionally are available. More specifically, the laser diode (LD) 22 is driven by the LD driver 30, and the transmitting data DTT is transmitted as a laser beam from the laser diode 22. On the other hand, the received data DTR is received via the lens 20 and the PIN photodiode 24, and is amplified via the transimpedance amplifier 28 and the limiting amplifier 26. The communication rate of approximately 1 Gbps to approximately 10 Gbps of can be achieved, thereby achieving high-speed data transmission DT. Moreover, if the laser diode 22 uses a laser beam with the wavelength region of equal to or greater than 800 nm, and the PIN photodiode 24 is composed of gallium arsenide based materials, it is suitable for securing the rapidity of the data communications.

(Example of Combination of Devices)

FIG. 6 illustrates an example of combination of devices composing the wireless power supply receiver-transmitter device according to the embodiment. As shown in FIG. 6, the data transmission DT and the power transmission PT can be bidirectionally executed wirelessly between the mobile device 34 and the desktop device 36. Specifically, the mobile device 34 is the mobile phone 34a, the digital still camera 34b, the video camera 34c, etc. Specifically, the desktop device 36 is the desktop computer 36a, the printer 36b, the television set 36c, the notebook computer 36d, etc. According to such a configuration, image data, e.g. a moving image and a still image, photographed in the mobile device 34 can be wirelessly transmitted to the desktop device 36 through the data transmission DT and the power transmission PT, and then the transmitted image data can be displayed on a large-sized screen provided on the desktop device 36. Moreover, the image data stored in the desktop device 36 can be wirelessly transmitted to the mobile device 34 through the data transmission DT and the power transmission PT, and then the transmitted image data can also be browsed away from home using the mobile device 34.

Figure 7A:
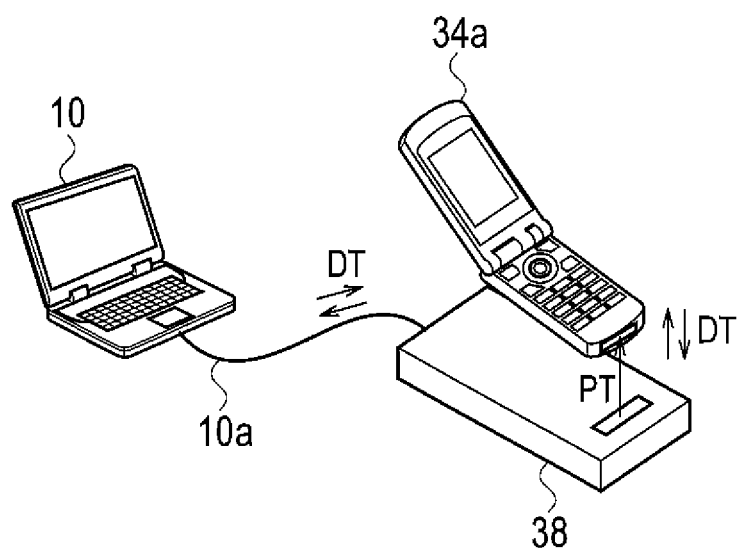
FIG. 7A is a diagram showing a schematic bird's-eye view configuration diagram showing an illustrative example of the combination example of the devices shown in FIG. 6, and showing an aspect that of a mobile phone is subjected to the wireless charging.
Figure 7B:
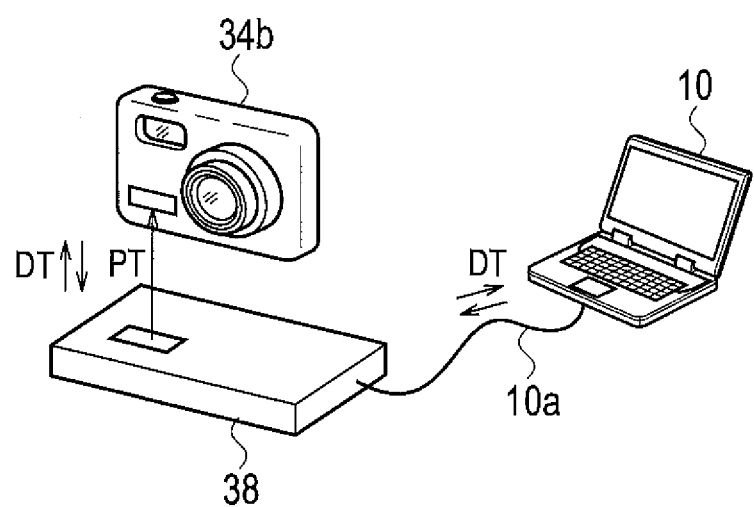
FIG. 7B is a diagram showing a schematic bird's-eye view configuration diagram showing an illustrative example of the combination example of the devices shown in FIG. 6, and showing an aspect that of a digital still camera is subjected to the wireless charging.

FIGS. 7A and 7B illustrate schematic bird's-eye view configurations showing illustrative examples of combination of the devices shown in FIG. 6. As shown in FIG. 7A, the notebook computer 10 and the docking station 38 are connected via a connecting cable 10a, e.g. a USB cable, and then the mobile phone 34a becomes charged wirelessly through the docking station 38. The data transmission DT may be wirelessly executed between the notebook computer 10 and the docking station 38, and the data transmission DT may also be wirelessly executed between the mobile phone 34a and the docking station 38. Moreover, as shown in FIG. 7B, the notebook computer 10 and the docking station 38 are connected via a connecting cable 10a, and then the digital still camera 34b becomes charged wirelessly through the docking station 38. According to such a configuration, image data photographed in the mobile phone 34a, the digital still camera 34b, etc. can be wirelessly transmitted through the data transmission DT to the notebook computer 10, and then the transmitted image data can be backed up to high-capacity storage devices mounted in the desktop device 36. Moreover, the data transmission DT may be wirelessly executed between the notebook computer 10 and the docking station 38, and the data transmission DT may also be wirelessly executed between the digital still camera 34b and the docking station 38. Although the notebook computer is used in the examples shown in FIGS. 7A and 7B, it is not necessary to use the notebook computer, and devices having image display functions can also used.

(Illustrative Example of Data Transmission)

Figure 8A:
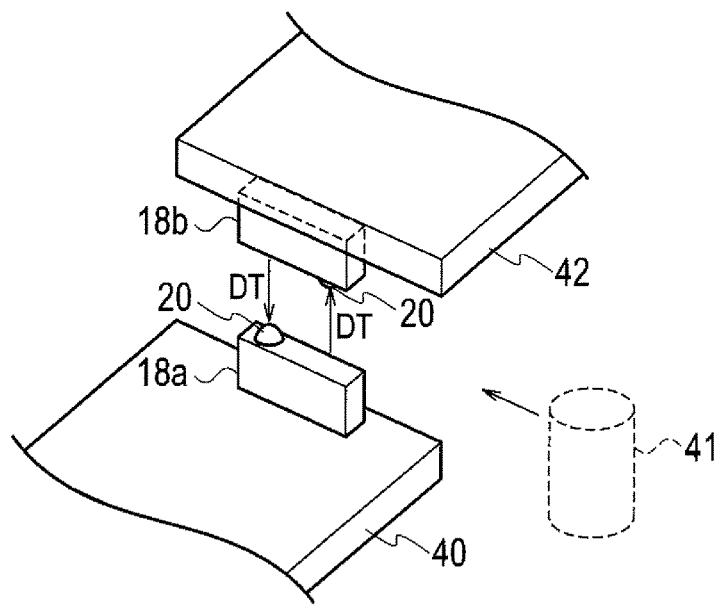
FIG. 8A is a diagram showing a schematic bird's-eye view configuration diagram showing an illustrative example of a data transmission executed in the wireless power supply receiver-transmitter device according to the embodiment, and showing an aspect that laser link modules are respectively disposed in a main board and a sub board.
Figure 8B:
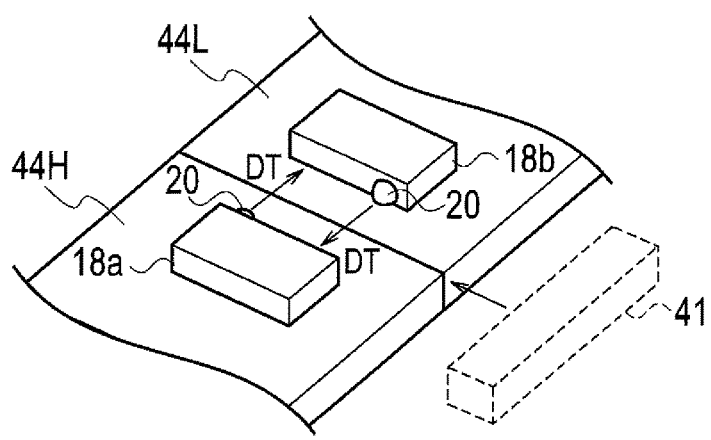
FIG. 8B is a diagram showing a schematic bird's-eye view configuration diagram showing an illustrative example of a data transmission executed in the wireless power supply receiver-transmitter device according to the embodiment, and showing an aspect that laser link modules are respectively disposed in a high voltage region and a low voltage region in the same board.
Figure 8C:
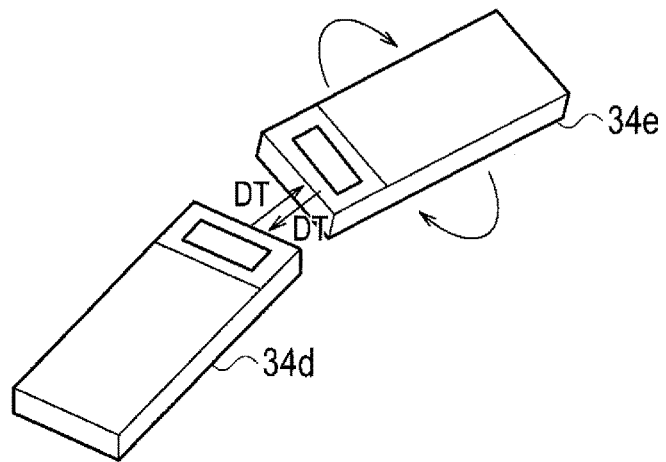
FIG. 8C is a diagram showing a schematic bird's-eye view configuration diagram showing an illustrative example of a data transmission executed in the wireless power supply receiver-transmitter device according to the embodiment, and showing an aspect that the data transmission is executed between mobile devices.

FIGS. 8A, 8B and 8C illustrate schematic bird's-eye view configurations showing illustrative examples of the data transmission DT executed in the wireless power supply receiver-transmitter device according to the embodiment.

For example, as shown in FIG. 8A, the laser link module 18a is vertically disposed on the surface of the main board 40, and the laser link module 18b is vertically disposed on the back side surface of the sub board 42. Then, the surfaces where lenses 20 are disposed of laser link modules 18a, 18b are opposed to (face to face with) each other to be covered with a cover 41. Accordingly, the data transmission DT can be achieved bidirectionally between the main board 40 and the sub board 42.

Moreover, as shown in FIG. 8B, the laser link modules 18a, 18b are horizontally disposed respectively on a high voltage region 44H and a low voltage region 44L on the same board. Then, the surfaces where lenses 20 are disposed of laser link modules 18a, 18b are opposed (face to face with) to each other to be covered with a cover 41. Accordingly, the data transmission DT can be achieved bidirectionally between the high voltage region 44H and the low voltage region 44L on the same board.

Moreover, as shown in FIG. 8C, the laser link modules 18 are disposed respectively on arbitrary regions of the mobile devices 34d, 34e. Then, the laser link modules 18 of mobile devices 34d, 34e are opposed (face to face with) to each other, thereby achieving the data transmission DT bidirectionally between the mobile devices 34d, 34e.

(Docking Station)

Figure 9:
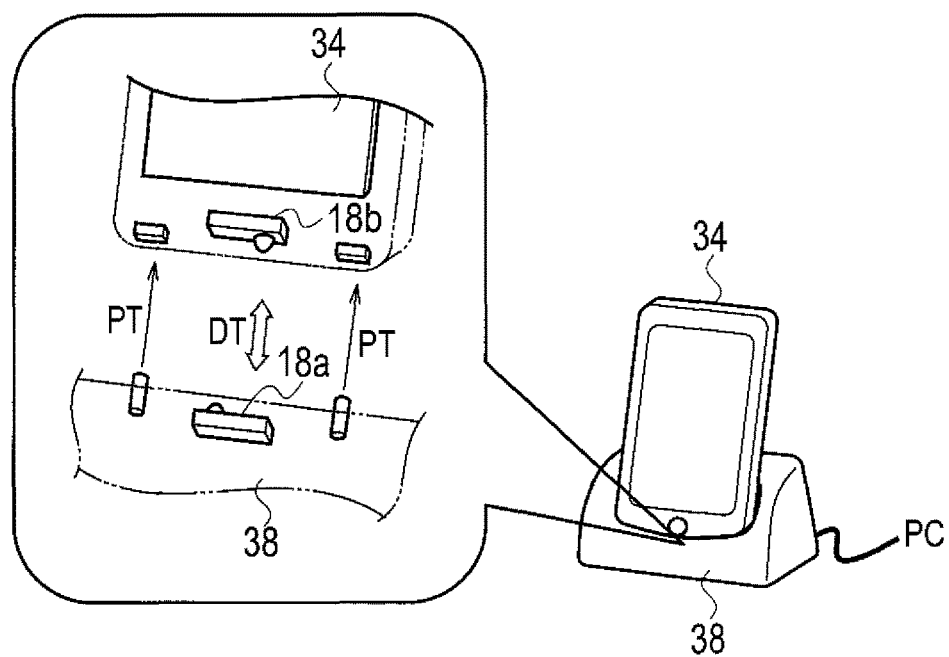
FIG. 9 is a schematic bird's-eye view configuration diagram showing an example of connection between a docking station and a mobile device which are used in the wireless power supply receiver-transmitter device according to the embodiment.

FIG. 9 illustrates a schematic bird's-eye view configuration showing an example of connection between the docking station 38 and the mobile device 34 which are used in the wireless power supply receiver-transmitter device according to the embodiment. As shown in FIG. 9, there is a configuration where the mobile device 34 becomes charged wirelessly through the docking station 38 when the mobile device 34 is plugged in an opening of the docking station 38.

During the wireless charging, the data transmission DT bidirectionally is available by opposing the laser link module 18a provided on the opening of the docking station 38 and the laser link module 18b provided on the bottom of the mobile device 34 to each other.

(Disposition Example of Laser Link Module)

Figure 10:
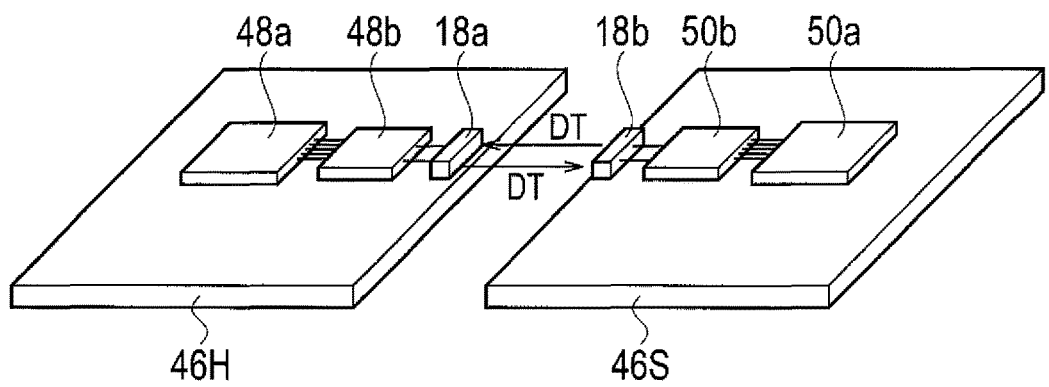
FIG. 10 is a schematic bird's-eye view configuration diagram showing an example of disposition of the laser link modules used in the wireless power supply receiver-transmitter device according to the embodiment.

FIG. 10 illustrates a schematic bird's-eye view configuration showing a disposition example of the laser link modules 18a, 18b used in the wireless power supply receiver-transmitter device according to the embodiment. As shown in FIG. 10, the laser link module 18a is disposed on an edge part of a printed circuit board 46H on which electronic parts 48a, 48b are mounted. Moreover, the laser link module 18b is disposed on an edge part of another printed circuit board 46S on which electronic parts 50a, 50b are mounted. Since the communication systems between the laser link modules 18a, 18b optical communications, the laser link modules 18a, 18b are insensitive to an influence of an electromagnetic wave noise radiated from the electronic parts 48a, 48b, 50a, 50b. Therefore, even if the laser link modules 18a, 18b are disposed near the electronic parts 48a, 48b, 50a, 50b, stable data transmission DT is realizable.

Figure 11:
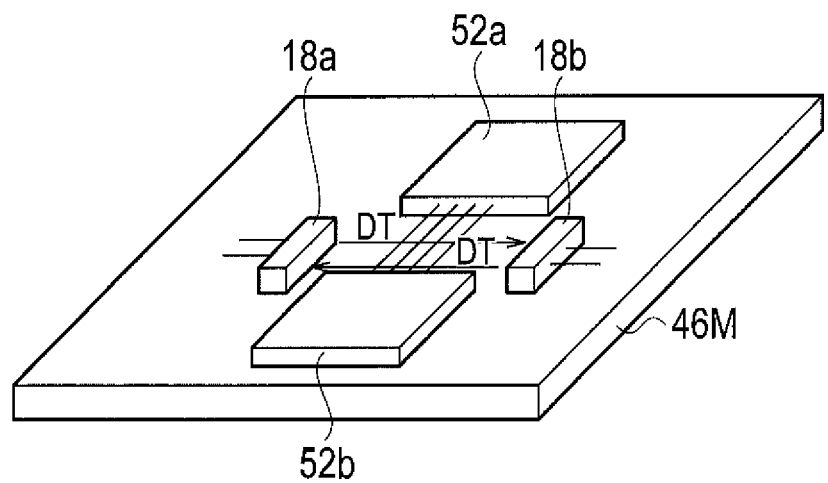
FIG. 11 is a schematic bird's-eye view configuration diagram showing another example of disposition of the laser link modules used in the wireless power supply receiver-transmitter device according to the embodiment.

FIG. 11 illustrates a schematic bird's-eye view configuration showing another disposition example of the laser link modules 18a, 18b used in the wireless power supply receiver-transmitter device according to the embodiment. As shown in FIG. 11, the data transmission DT can also be bidirectionally executed wirelessly between the laser link modules 18a, 18b over a wiring pattern which connects between the electronic parts 52a and 52b. Accordingly, since a flexibility of the layout is increased, it becomes possible to make the printed circuit board 46M more compact.

Figure 12:
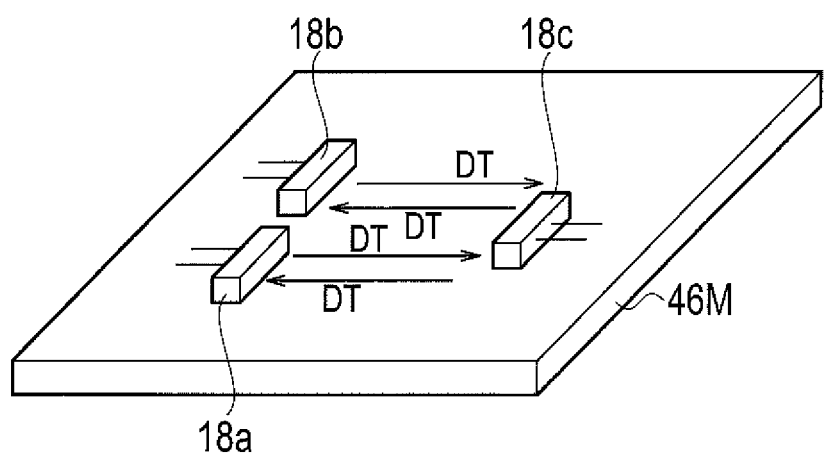
FIG. 12 is a schematic bird's-eye view configuration diagram showing still another example of disposition of the laser link modules used in the wireless power supply receiver-transmitter device according to the embodiment.

FIG. 12 illustrates a schematic bird's-eye view configuration showing still another disposition example of the laser link modules 18a, 18b, 18c used in the wireless power supply receiver-transmitter device according to the embodiment. As shown in FIG. 12, the laser link modules 18a, 18b, and 18c are disposed on the printed circuit board 46M. In this case, the data transmission DT can also be bidirectionally executed wirelessly between one laser link module 18c and a plurality of the laser link modules 18a, 18b. A laser link module 18c may function as a data splitter/data selector to transmit and receive the same data to/from laser link modules 18a, 18b, or to transmit and receive different data selectively thereto/therefrom.

Figure 13:
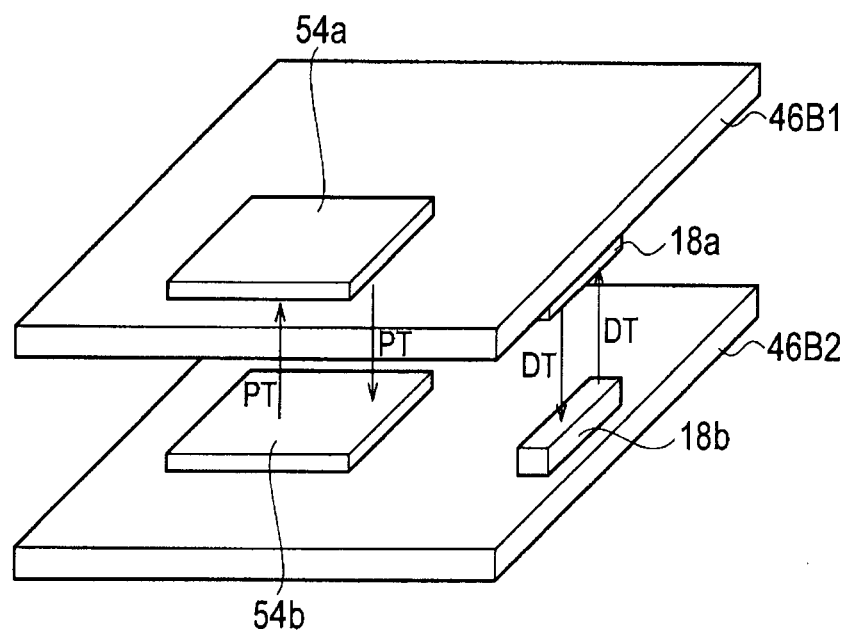
FIG. 13 is a schematic bird's-eye view configuration diagram showing an example of disposition of the laser link modules and electronic parts for power transmission used in the wireless power supply receiver-transmitter device according to the embodiment.

FIG. 13 illustrates a schematic bird's-eye view configuration showing a disposition example of the laser link modules 18a, 18b and electronic parts 54a, 54b for power transmission which are used in the wireless power supply receiver-transmitter device according to the embodiment. As shown in FIG. 13, the electronic part 54a for power transmission is disposed on the surface of the printed circuit board 46B1, and the laser link module 18a is disposed on the back side surface thereof. Moreover, the electronic part 54b for power transmission and the laser link module 18b are disposed on the surface of the printed circuit board 46B2. As shown in FIG. 13, a direction of the power transmission PT may not be limited to one way, and may also be bidirectional. In this case, both of the power transmission system and the data transmission system can be fully made symmetrical. In this case, the back side surface of the printed circuit board 46B1 and the surface of the printed circuit board 46B2 are disposed to be opposed (face to face with) to each other. Accordingly, the power transmission PT can be bidirectionally executed between the electronic parts 54a, 54b for power transmission, and the data transmission DT can be bidirectionally executed between the laser link modules 18a, thereby achieving slimming down of the devices.

Figure 14:
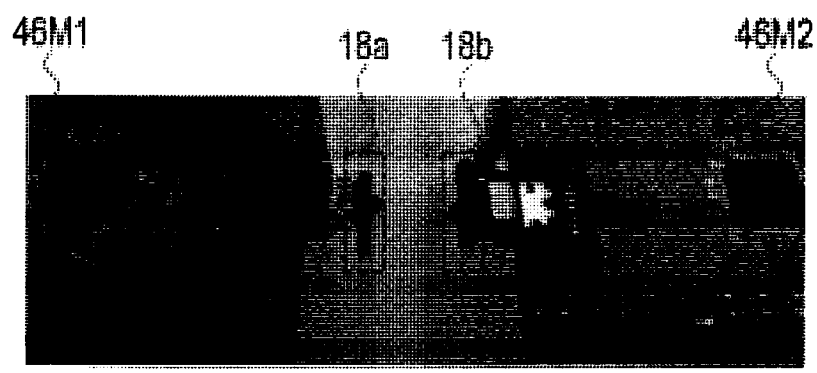
FIG. 14 is a photograph showing an example of the state where the laser link modules used in the wireless power supply receiver-transmitter device according to the embodiment are mounted on a printed circuit board.
Figure 15A:
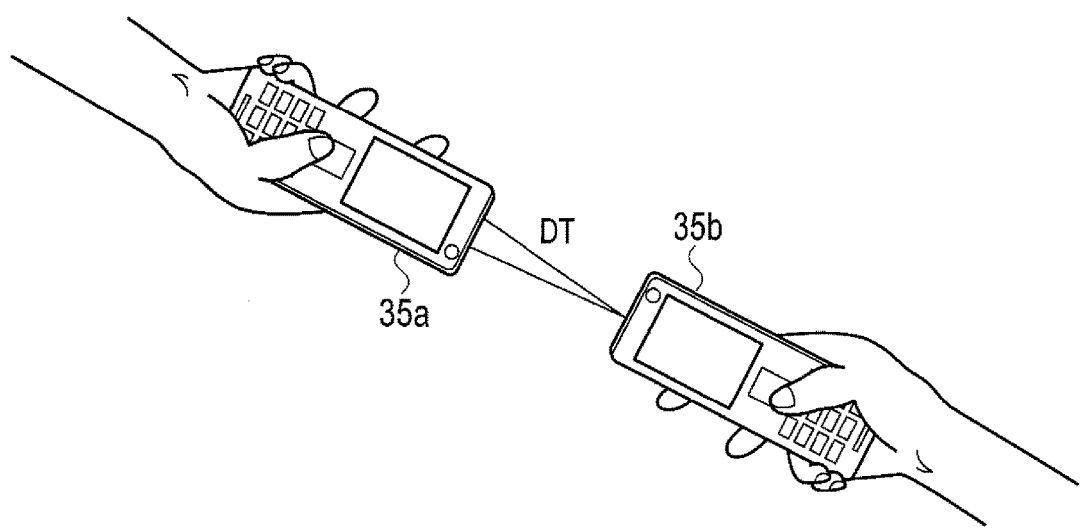
FIG. 15A is a diagram showing a schematic bird's-eye view configuration diagram showing an illustrative example of a data transmission executed in the wireless power supply receiver-transmitter device according to the embodiment, and showing an aspect that moving image is transmitted from a mobile phone to a mobile phone.
Figure 15B:
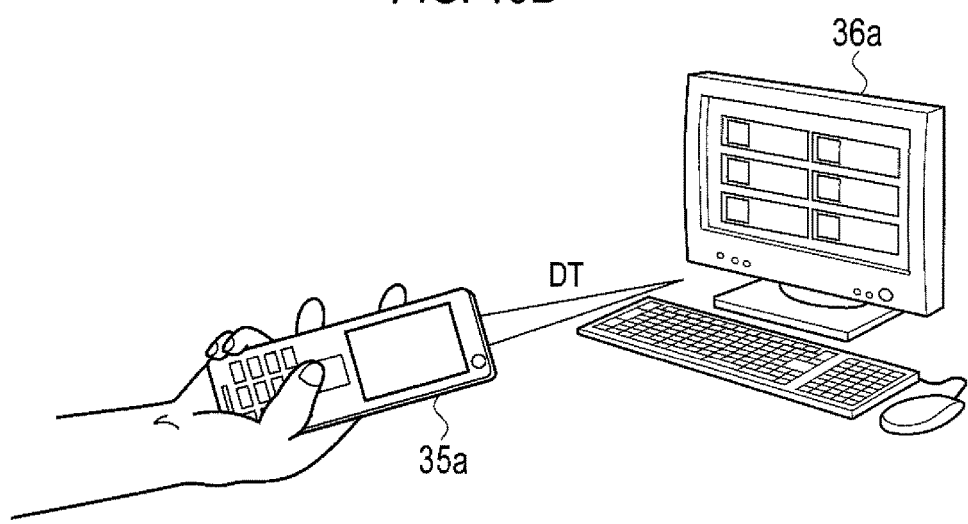
FIG. 15B is a diagram showing a schematic bird's-eye view configuration diagram showing an illustrative example of a data transmission executed in the wireless power supply receiver-transmitter device according to the embodiment, and showing an aspect that moving image is transmitted from a desktop computer to a mobile phone.

FIG. 14 illustrates an example of photograph showing the state where the laser link modules 18a, 18b used in the wireless power supply receiver-transmitter device according to the embodiment are mounted on printed circuit boards 46M1 and 46M2. The laser link modules 18a, 18b are excellent in waterproofness since laser link modules 18a, 18b can wirelessly execute the optical communications. Moreover, since high-capacity data can be transmitted safely at higher speed, it is suitable for the data transmission DT of moving image. For example, as shown in FIG. 15A, the data transmission DT of moving image may be wirelessly executed from the mobile phone 35b to the mobile phone 35a. Moreover, as shown in FIG. 15B, the data transmission DT of moving image may be wirelessly executed from the desktop computer 36a to the mobile phone 35a. The data transmission DT of moving image (approximately 4.7 G bytes) recorded on one sheet of digital versatile disc (DVD) can be completed in approximately 10 seconds.

Although the case where the optical communications are executed through the space transmission is illustrated, the embodiment is not limited to the aforementioned case. For example, the optical communications can also be executed through the optical fiber transmission, if between the mobile device 35a and the mobile device 35b, and/or between the desktop computer 36a and the mobile phone 35a are connected with an optical fiber, as usage.

(Gallium Nitride Based Field Effect Transistor)

Figure 16:
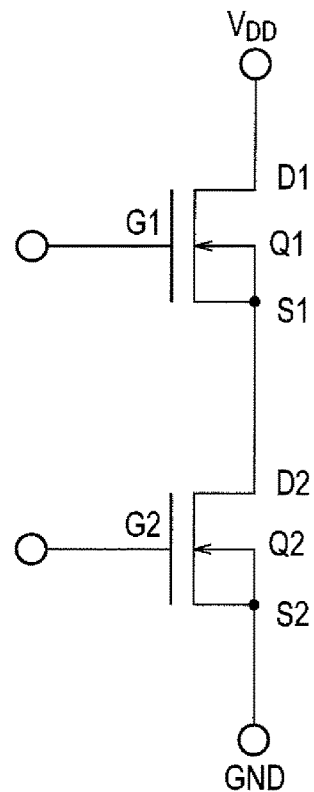
FIG. 16 is a configuration diagram showing a half bridge circuit using a gallium nitride based field effect transistor used in the wireless power supply receiver-transmitter device according to the embodiment.

FIG. 16 illustrates a configuration of a half bridge circuit using gallium nitride based field effect transistors Q1, Q2 used in the wireless power supply receiver-transmitter device according to the embodiment. As shown in FIG. 16, the source S1 of the field effect transistor Q1 and the drain D2 of the field effect transistor Q2 are connected. The drain D1 of the field effect transistor Q1 is connected to a power source $V_{DD}$, and the source S2 of the field effect transistor Q2 is connected to ground GND.

Figure 17:
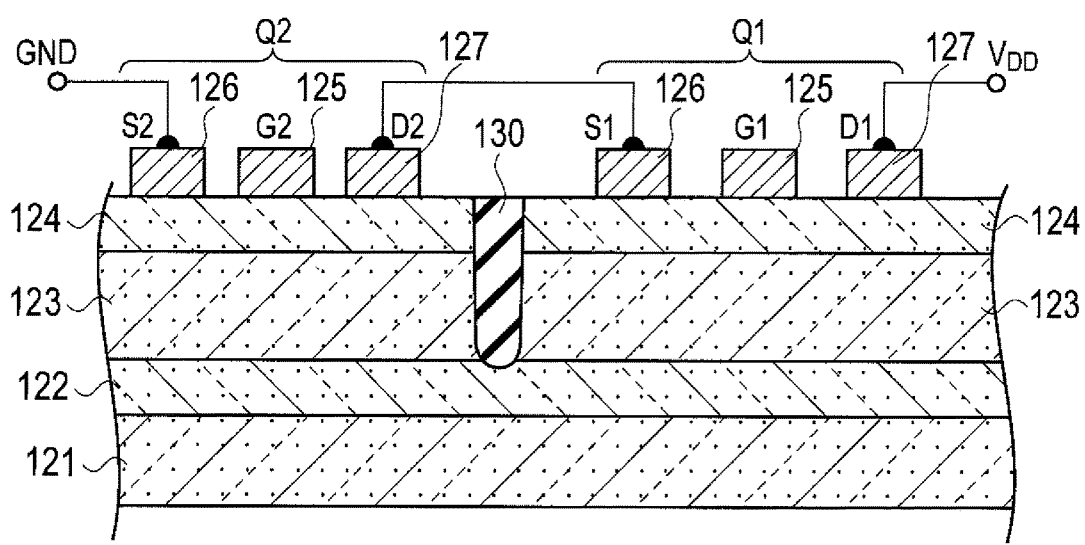
FIG. 17 is a schematic cross-sectional structure diagram showing the half bridge circuit shown in FIG. 16 composed of the gallium nitride based field effect transistor.
Figure 18:
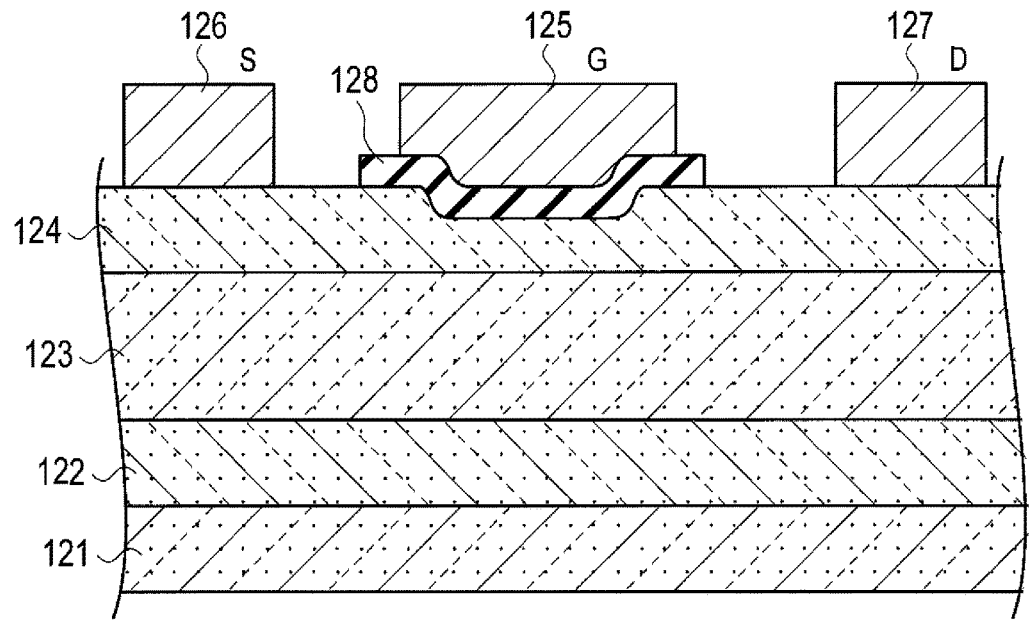
FIG. 18 is a schematic cross-sectional structure diagram showing near a gate electrode of the gallium nitride based field effect transistor shown in FIG. 17.

FIG. 17 illustrates a schematic cross-sectional structure showing the half bridge circuit shown in FIG. 16 composed of the gallium nitride based field effect transistor. Moreover, FIG. 18 illustrates a schematic cross-sectional structure near the gate electrode of the gallium nitride based field effect transistor shown in FIG. 17. Although a recessed region is formed on a barrier layer 124 composed of an AlGaN layer, the recessed region may reach to a channel layer 123 comprised of a GaN layer.

As shown in FIG. 17, the gallium nitride based field effect transistors Q1, Q2 include: a buffer layer 122 formed on a silicon substrate 121; a channel layer 123 composed of a GaN layer formed on the buffer layer 122; and a barrier layer 124 composed of AlGaN formed on the channel layer 123, for example. A gate electrode 125 (G1), a source electrode 126 (S1), and a drain electrode 127 (D1) of the field effect transistor Q1 are formed on the barrier layer 124, and a gate electrode 125 (G2), a source electrode 126 (S2), and a drain electrode 127 (D2) of the field effect transistor Q2 are formed on the barrier layer 124. As shown in FIG. 18, an insulating layer ($Al_2O_3$) 128 is formed between the gate electrode 125 (G1, G2) and the barrier layer 124. Although a recessed region is not formed on the barrier layer 124 shown in FIG. 17, it is assumed that the structure includes a recessed region as shown with FIG. 18.

As shown in FIG. 17, ion implantation with helium, boron ion, etc., for example, is performed between the source electrode 126 (S1) of the field effect transistor Q1 and the drain electrode 127 (D2) of the field effect transistor Q2, and then an approximately 1 micron-depth high-resistivity element isolation region 130 is formed by the aforementioned ion implantation. In order to avoid that a profile of the high-resistivity element isolation region 130 becomes a ridge shaped impurity doping profile, it is preferable to perform multiple ion implantation with accelerating energy so that the value of the accelerating energy is changed to 350 keV→240 keV→150 keV→70 keV→20 keV, for example. Accordingly, the implanted ion can be distributed over a rectangular distribution. In order to prevent a channeling effect of implanted ions, the wafer is inclined 7 degrees, for example, toward the ion implantation direction, in the present embodiment. Furthermore, the value of an amount of the dosage may be changed to $2.6 \times 10^{14} \rightarrow 1.3 \times 10^{14} \rightarrow 1.3 \times 10^{14} \rightarrow 1.3 \times 10^{14} \rightarrow 9.6 \times 10^{14}$ [ions/cm$^2$], for example, corresponding to the above-mentioned multiple ion implantation.

The device formed as shown in FIG. 17 is wired in wafer process so as to be monolithically formed in the wiring state equivalent to the wiring state shown in FIG. 16. If the completed device in this manner is mounted on a board, it is not necessary to carry out the electrical wiring on the board in order to form the configuration shown in FIG. 16. Accordingly, an electromagnetic wave noise occurring due to the wire length, and an inductance component added to the circuit can be reduced, and a mounted area can be reduced.

In the gallium nitride based field effect transistors Q1, Q2, a heterojunction is formed between the channel layer 123 comprised of GaN and the barrier layer 124 composed of AlGaN, and two-dimensional electron gas is generated at the heterojunction interface. Therefore, two-dimensional electron gas acts as a carrier, and then the channel layer 123 exhibits electrical conductivity.

In the present embodiment, the gallium nitride based field effect transistors Q1, Q2 are used as a switching device in the power transmitter unit (TU) 64. Accordingly, since a high value of the switching/driving frequency equal to or greater than 5 MHz or equal to or greater than 10 MHz is achieved with an amount of comparatively lower gate charges, the field effect transistors Q1, Q2 can be operated at higher frequency, compared with the case where silicon is used. Consequently, since the value of the coil parameter α in the primary-side coil 14 and the secondary-side coil 16 can be increased, thereby improving the maximum transmitting efficiency $\eta_{MAX}$.

(Block Configuration)

Figure 19:
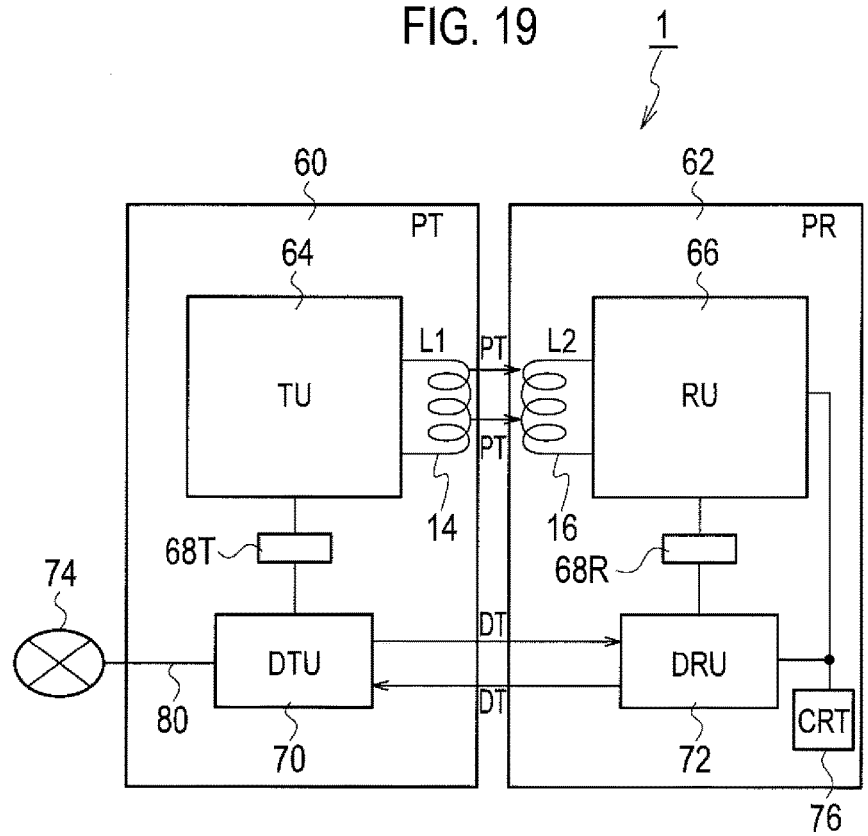
FIG. 19 is a schematic block configuration diagram showing the wireless power supply receiver-transmitter device according to the embodiment.

FIG. 19 illustrates a schematic block configuration of the wireless power supply receiver-transmitter device 1 according to the embodiment. As shown in FIG. 19, in the wireless power supply receiver (PR) 62, the power receiver unit (RU) 66 which wirelessly receives electric power through the power transmission PT using the secondary-side coil 16, and the data transmitter/receiver unit (DRU) 72 which receives data through the data transmission DT with the optical communications are connected to each other via an interface 68R. The data received in the DRU 72 can be displayed on a display (CRT) 76. On the other hand, in the wireless power supply transmitter (PT) 60, the power transmitter unit (TU) 64 configured to wirelessly transmit electric power through the power transmission PT using the primary-side coil 14, and a data transmitter/receiver unit (DTU) 70 configured to transmit data through the data transmission DT with the optical communications are connected to each other via an interface 68T. The DTU 70 is connected to the Internet 74 via a connecting cable 80.

In this case, the data transmitter/receiver unit (DRU) 72 may be configured to operate with the power supply from the wireless power supply transmitter (PT) 60.

Figure 20:
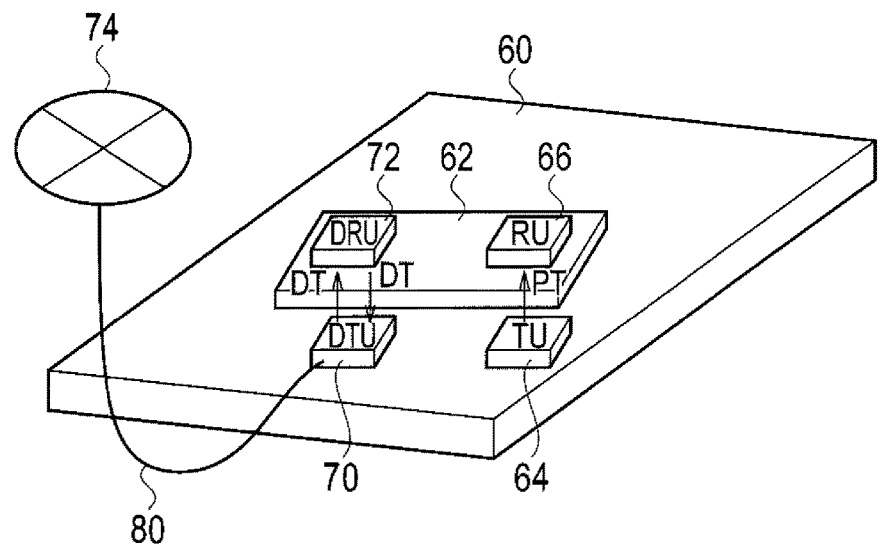
FIG. 20 is a schematic bird's-eye view configuration diagram showing an illustrative example of the wireless power supply receiver-transmitter device shown in FIG. 19.

FIG. 20 illustrates a schematic bird's-eye view configuration showing an illustrative example of the wireless power supply receiver-transmitter device 1 shown in FIG. 19. Here, there will be illustrated a case where the DTU 70 obtains (downloads) a movie over the Internet 74. In this case, the wireless power supply transmitter (PT) 60 corresponds to a home server, for example, and the wireless power supply receiver (PR) 62 corresponds to a tablet-type device, for example. Accordingly, the tablet-type device can become charged wirelessly, while the movie obtained over the Internet 74 can be easily browsed using the tablet-type device.

Figure 21:
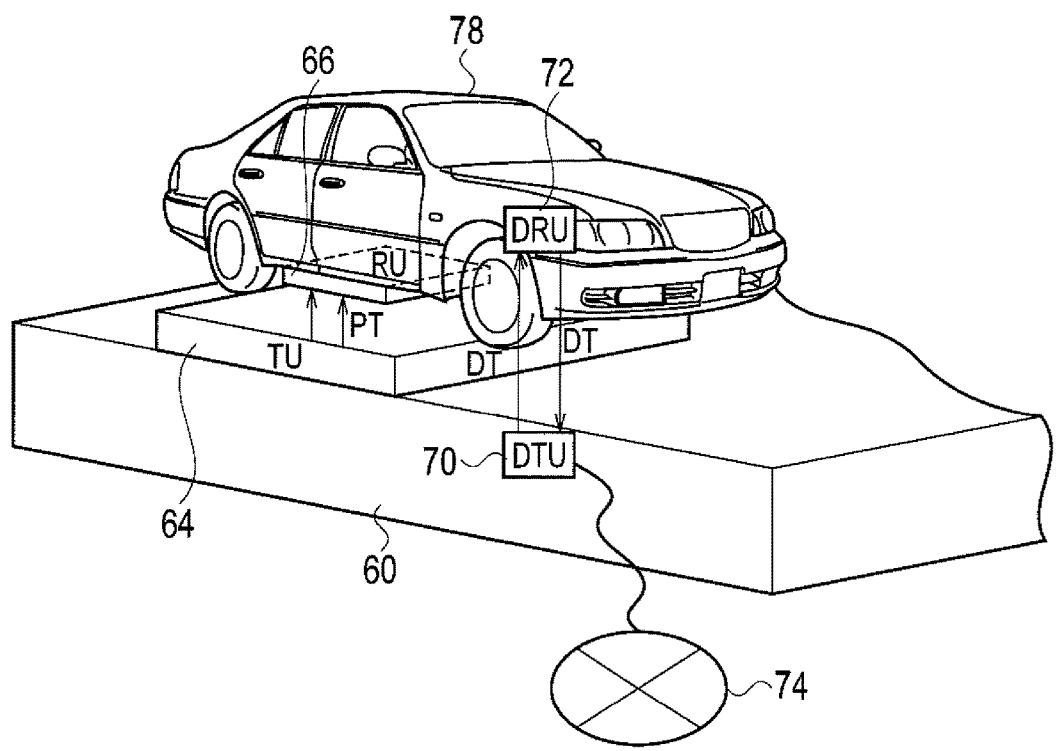
FIG. 21 is a schematic bird's-eye view configuration diagram showing another illustrative example of the wireless power supply receiver-transmitter device shown in FIG. 19.

FIG. 21 illustrates a schematic bird's-eye view configuration showing another illustrative example of the wireless power supply receiver-transmitter device 1 shown in FIG. 19. Here, there will be illustrated a case where an electric vehicle 78 becomes charged at a plug-in station. In this case, the electric vehicle 78 corresponds to the wireless power supply receiver (PR) 62, and the plug-in station corresponds to the wireless power supply transmitter (PT) 60. That is, the RU 66 and the DRU 72 are mounted in the electric vehicle 78, and the TU 64 and the DTU 70 are mounted in the plug-in station. If a car-navigation system is mounted in the electric vehicle 78, the DTU 70 may obtain update information for the car-navigation system from the Internet 74, and may transmits the obtained update information to the DRU 72 through the data transmission DT. Accordingly, the electric vehicle 78 becomes charged wirelessly, and the map data, etc. of the car-navigation system can also be updated to the latest version using the update information obtained over the Internet 74.

Figure 22:
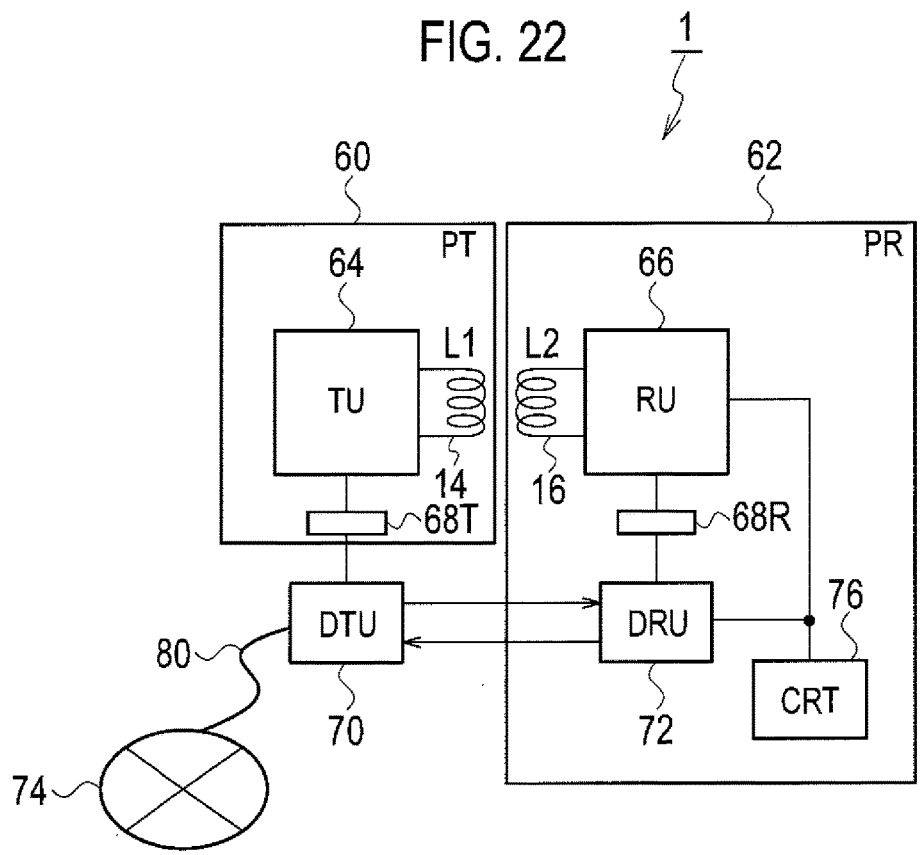
FIG. 22 is another schematic block configuration diagrams showing the wireless power supply receiver-transmitter device according to the embodiment.

FIG. 22 illustrates still another schematic block configuration of the wireless power supply receiver-transmitter device 1 according to the embodiment. A different point from the block configuration shown in FIG. 19 is a point that the DTU 70 is placed in the outside of the wireless power supply transmitter (PT) 60. More specifically, as shown in FIG. 22, the wireless power supply transmitter (PT) 60 includes the TU 64 and the interface 68T, and the DTU 70 is connected to the interface 68T. Naturally, the DTU 70 can execute the data transmission DT wirelessly from/to the DRU 72, and can be connected to the Internet 74 via the connecting cable 80.

Figure 23:
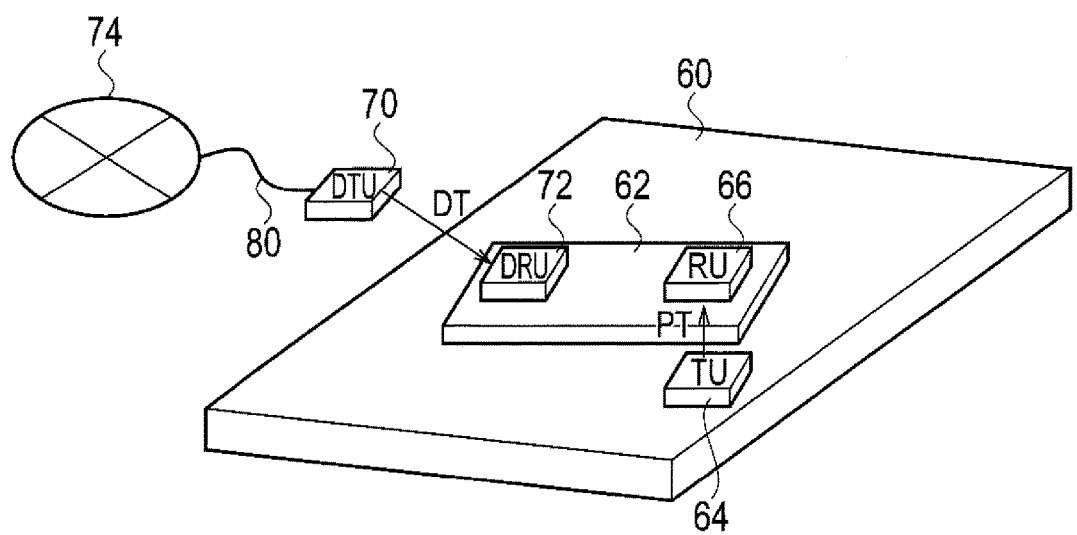
FIG. 23 is a schematic bird's-eye view configuration diagram showing an illustrative example of the wireless power supply receiver-transmitter device shown in FIG. 22.

FIG. 23 illustrates a schematic bird's-eye view configuration showing an illustrative example of the wireless power supply receiver-transmitter device 1 shown in FIG. 22. Here, there will be illustrated a case where a movie obtained over the Internet 74 is browsed using a tablet-type device in the same manner as the case shown in FIG. 20. Except for a point that the DTU 70 is placed in the outside of the wireless power supply transmitter (PT) 60, it is the same as that of FIG. 20.

Figure 24:
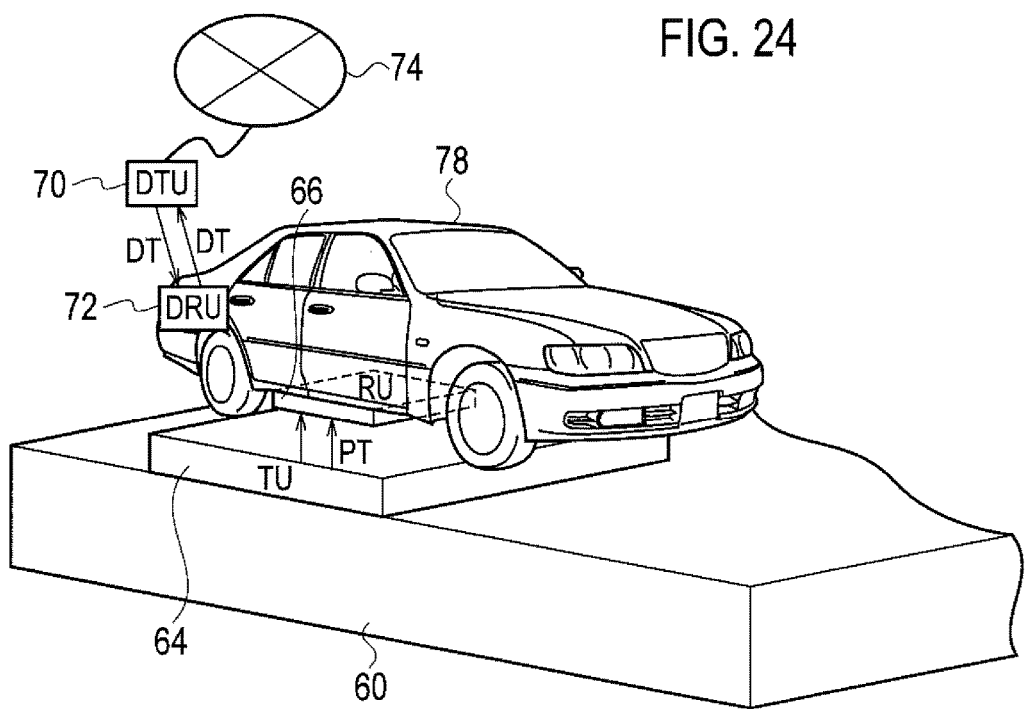
FIG. 24 is a schematic bird's-eye view configuration diagram showing another illustrative example of the wireless power supply receiver-transmitter device shown in FIG. 22.

FIG. 24 illustrates a schematic bird's-eye view configuration showing another illustrative example of the wireless power supply receiver-transmitter device 1 shown in FIG. 22. Here, there will be illustrated a case where an electric vehicle 78 becomes charged at a plug-in station in the same manner as the case shown in FIG. 21. Except for a point that the DTU 70 is placed in the outside of the wireless power supply transmitter (PT) 60, it is the same as that of FIG. 21.

Figure 25:
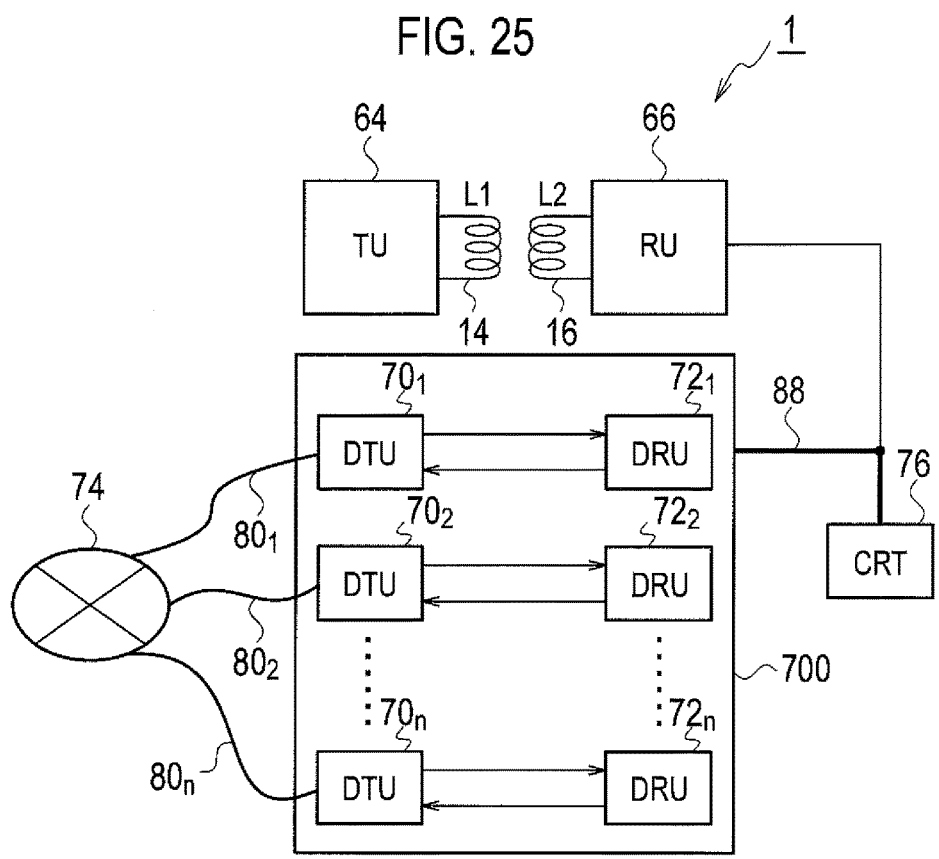
FIG. 25 is another schematic block configuration diagrams showing the wireless power supply receiver-transmitter device according to the embodiment.

FIG. 25 illustrates still another schematic block configuration of the wireless power supply receiver-transmitter device 1 according to the embodiment. As shown in FIG. 25, a plurality of sets of transmitter and receiver may be connected in parallel with each other in the data transmitter/ receiver unit 700. Specifically, the data transmitter/receiver unit 700 includes first to $n^{th}$ DTU $70_1$-$70_n$ and first to $n^{th}$ DRU $72_1$-$72_n$. The data transmission DT can be executed between the first DTU $70_1$ and the first DRU $72_1$, and between the second DTU $70_2$ and the second DRU $72_2$, . . . , and between the $n^{th}$ DTU $70_n$ and the $n^{th}$ DRU $72_n$. The other points are the same as that shown in FIG. 19. According to such a configuration, even if a high-capacity moving image is obtained over the Internet 74, it is possible to transmit the moving image through the data transmission DT in parallel, and to process the moving image at high speed.

Figure 26:
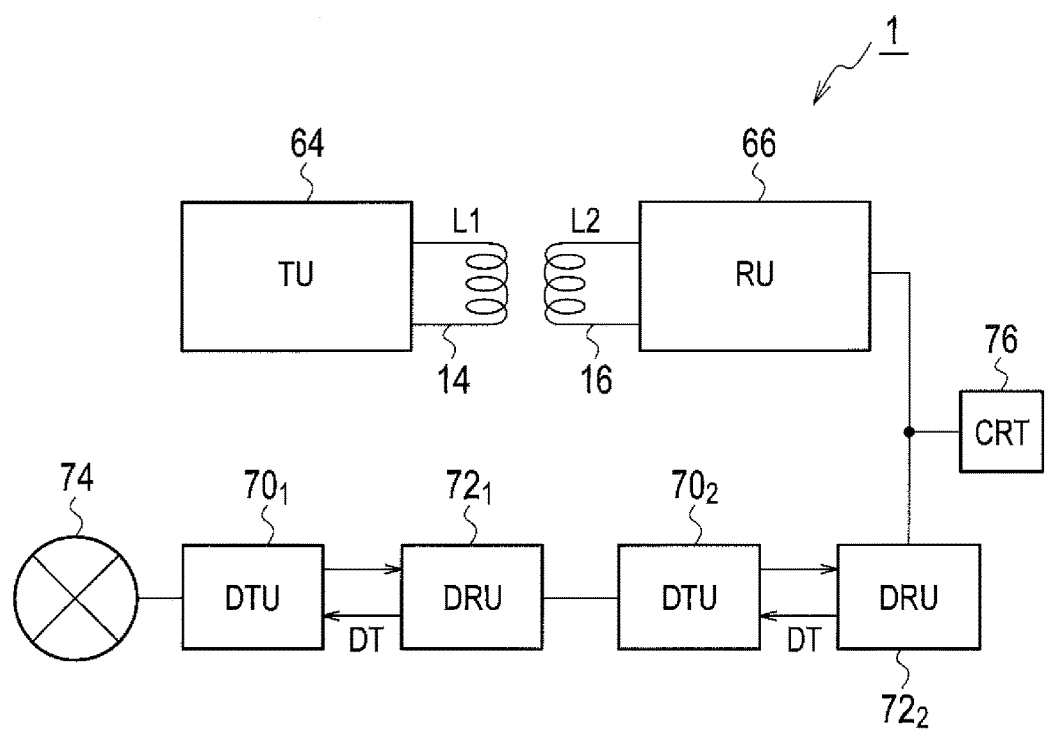
FIG. 26 is still another schematic block configuration diagrams showing the wireless power supply receiver-transmitter device according to the embodiment.

FIG. 26 illustrates another schematic block configuration of the wireless power supply receiver-transmitter device 1 according to the embodiment. As shown in FIG. 26, a plurality of sets of transmitter and receiver of the data transmitter/receiver unit 700 may be connected in series. In this case, the set of the first DTU $70_2$ and the first DRU $72_1$, and the set of the second DTU $70_2$ and the second DRU $72_2$ are connected in series via a connecting cable. The other points are the same as that shown in FIG. 19. It is also possible to further connect in parallel a plurality of configurations in which the plurality of sets of transmitter and receiver are connected in series, in the data transmitter/receiver unit.

(Circuit Configuration)

Figure 27:
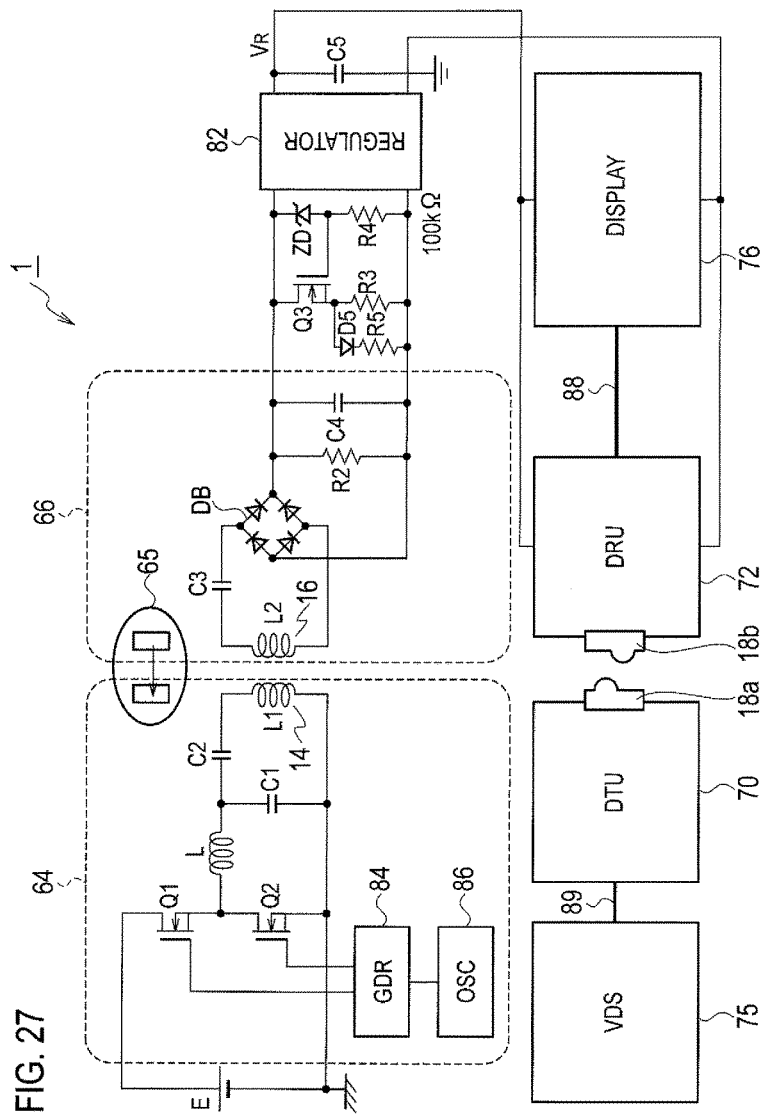
FIG. 27 is a configuration diagram showing an example of a specific circuit configuration of the wireless power supply receiver-transmitter device according to the embodiment.

FIG. 27 illustrates an example of a specific circuit configuration of the wireless power supply receiver-transmitter device 1 according to the embodiment. As shown in FIG. 27, the TU 64 includes: an oscillating circuit (OSC) 86; a gate driver (GDR) 84 connected to the OSC 86; a half bridge circuit connected to the GDR 84; a low pass filter (L, C1) connected to the half bridge circuit; a primary-side resonance capacitor C2 connected to the low pass filter (L, C1); and a primary-side coil 14 (L1) connected to the primary-side resonance capacitor C2, and configured to be tuned with the primary-side resonance capacitor C2 in a predetermined wireless power transmission carrier frequency band. It is preferable that the switching device (field effect transistors Q1, Q2) of the half bridge circuit is composed of gallium nitride (GaN) based materials, as already explained above. On the other hand, the RU 66 includes: a secondary-side coil 16; a secondary-side resonance capacitor C3 connected to the secondary-side coil 16, and configured to be tuned with the secondary-side coil 16 in a predetermined wireless power transmission carrier frequency band; and a diode bridge circuit DB connected to the secondary-side resonance capacitor C3. Each of the primary-side coil 14 and the secondary-side coil 16 mutually cancels a radioactive inductance component as a micro loop with nonradioactive primary-side resonance capacitor C2 and secondary-side resonance capacitor C3 by electromagnetic coupling between the primary-side coil 14 and the secondary-side coil 16, and the power transmission PT is wirelessly executed from the TU 64 toward the RU 66. During wireless charging, an orange light emitting diode D5 is turned ON. An approximately 2.5-kΩ resistor R5 is connected in series with the light emitting diode D5. If the coupling between the TU 64 and the RU 66 becomes imperfect during wireless charging because the primary-side coil 14 and the secondary-side coil 16 are displaced from their normal positions, for example, the feedback unit 65 detects such a state and then terminates the power transmission PT.

In order to protect the circuit in the power receiver side from an unintended high voltage, a Zener diode ZD, a protective transistor Q3, etc. are disposed in the subsequent stage of the RU 66. Moreover, the DRU 72 is connected with the display 76 via the switching regulator 82 for stabilizing an output. The display 76 and the DRU 72 may be connected via the connecting cable 88, e.g. a High-Definition Multimedia Interface (HDMI) cable. The laser link module 18*b* in the DRU 72 and the laser link module 18*a* in the DTU 70 are disposed ao as to be opposed to (face to face with) each other, and the DTU 70 and a video source (VDS) 75 are connected via a connecting cable 89, e.g. an HDMI cable. The VDS 75 are recording media, e.g. digital versatile discs.

(Coil Shape)

Figure 28A:
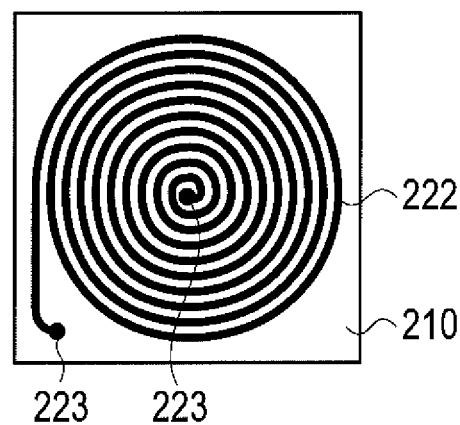
FIG. 28A is a schematic planar pattern configuration diagram showing a primary-side coil or a secondary-side coil used in the wireless power supply receiver-transmitter device according to the embodiment, and showing the case where the coil is formed in circle shape.
Figure 28B:
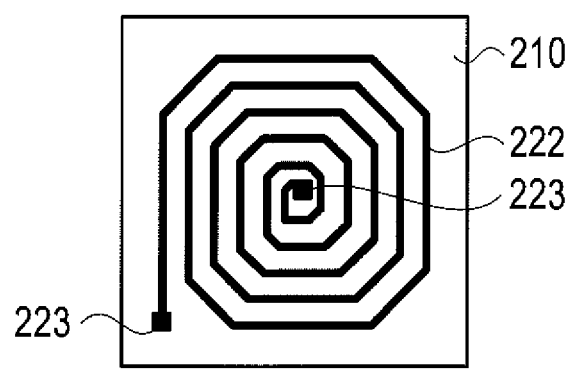
FIG. 28B is a schematic planar pattern configuration diagram showing the primary-side coil or the secondary-side coil used in the wireless power supply receiver-transmitter device according to the embodiment, and showing the case where the coil is formed in octagonal shape.

FIG. 28A and illustrate examples of a schematic planar pattern configuration of the primary-side coil 14 or the secondary-side coil 16 used in the wireless power supply receiver-transmitter device according to the embodiment. For example, as shown in FIG. 28A, a circular groove portion may be formed on a metal substrate 210, and then metal wiring layers 222, 223 may be formed in the circular groove portion. Alternatively, as shown in FIG. 28B, an octagon-shaped groove portion may be formed on the metal substrate 210, and then the metal wiring layers 222, 223 may be formed in the octagon-shaped groove portion. Thus, various shapes, e.g. a orbicular shape or an octagon, can be used as a coil shape of the primary-side coil 14 or the secondary-side coil 16. Naturally, it is also possible to use other shapes (a square, a triangle, etc.).

For example, effective radius of the primary-side coil 14 is approximately 6 cm, the primary-side resonance capacitor C2 is approximately 1.7 nF, and an equivalent resistance incident to copper loss is approximately 0.0012Ω. Effective radius of the secondary-side coil 16 is approximately 6 cm, the secondary-side resonance capacitor C3 is approximately 1.7 nF, and an equivalent resistance incident to copper loss is approximately 0.0012Ω. Both the amounts of copper wire of the primary-side coil 14 and the secondary-side coil 16 are approximately 10 cc. The power carrier frequency is approximately 10 MHz, and the wavelength is approximately 30 m.

Note that the constructional example shown in FIG. 28 is merely one example, and therefore it is not limited to the configuration. Small coils of which a value of the inductance is larger, the frequency characteristics are excellent, and Q value is higher value can be used for the primary-side coil 14 and the secondary-side coil 16.

Although, the metal wiring layer is formed in the groove portion on the metal substrate in the constructional example shown in FIG. 28, it is not limited to the configuration, and the metal wiring layer may be formed on an insulating substrate.

(Detailed Block Configuration)

Figure 29:
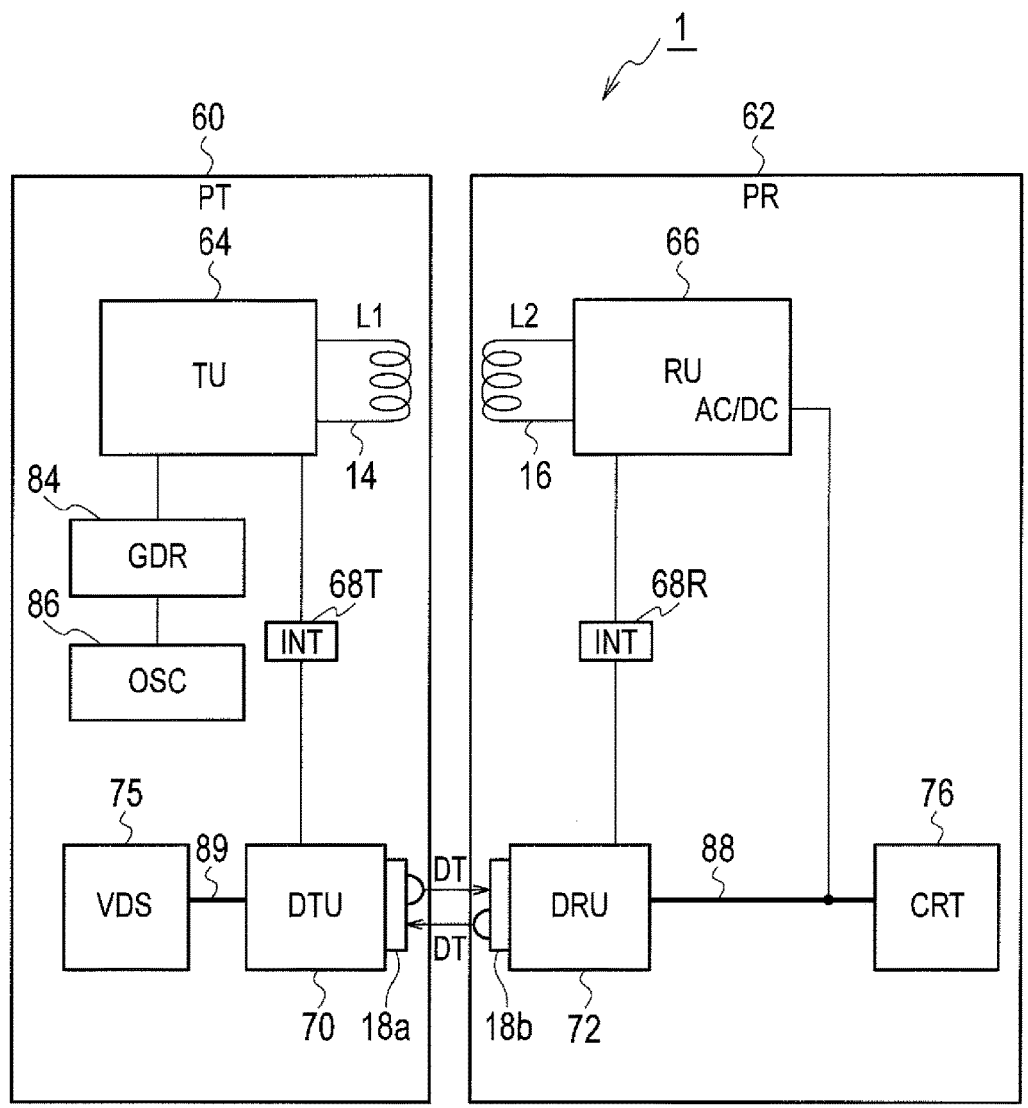
FIG. 29 is a detailed schematic block configuration diagram showing the wireless power supply receiver-transmitter device according to the embodiment.

FIG. 29 illustrates a detailed schematic block configuration of the wireless power supply receiver-transmitter device 1 according to the embodiment. As shown in FIG. 29, the wireless power supply receiver (PR) 62 includes: an RU 66; a DRU 72 connected to the RU 66 via an interface 68R; and a display 76 connected to the DRU 72 via a connecting cable 88. On the other hand, the wireless power supply transmitter (PT) 60 includes: an OSC 86; a GDR 84 connected to the OSC 86; a TU 64 connected to the GDR 84; a DTU 70 connected to the TU 64 via an interface 68T; and a VDS 75 connected to the DTU 70 via a connecting cable 89. An electric power is wirelessly supplied from the TU 64 to the RU 66, and optical communications are bidirectionally executed between a laser link module 18*a* mounted in the DTU 70 and a laser link module 18*b* mounted in the DRU 72. The DTU 70 can obtain moving image data etc. from the VDS 75 via the connecting cable 89.

Figure 30:
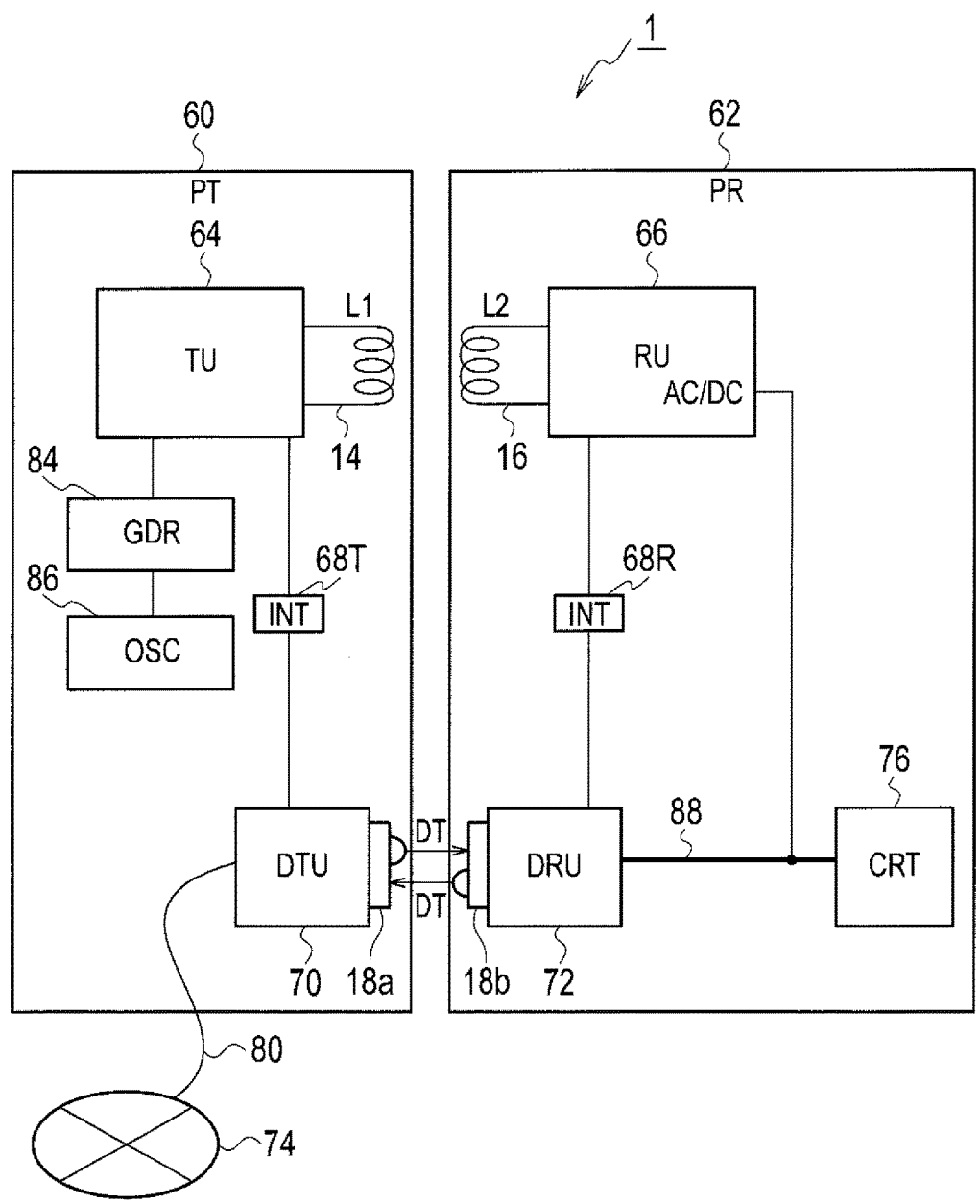
FIG. 30 is another detailed schematic block configuration diagrams showing the wireless power supply receiver-transmitter device according to the embodiment.

FIG. 30 illustrates another detailed schematic block configuration of the wireless power supply receiver-transmitter device 1 according to the embodiment. A different point from the configuration shown in FIG. 29 is a point that the VDS 75 instead of the DTU 70 is connected to the Internet 74. According to such a configuration, the DTU 70 can obtain moving image data etc. over the Internet 74 via the connecting cable 80.

Figure 31:
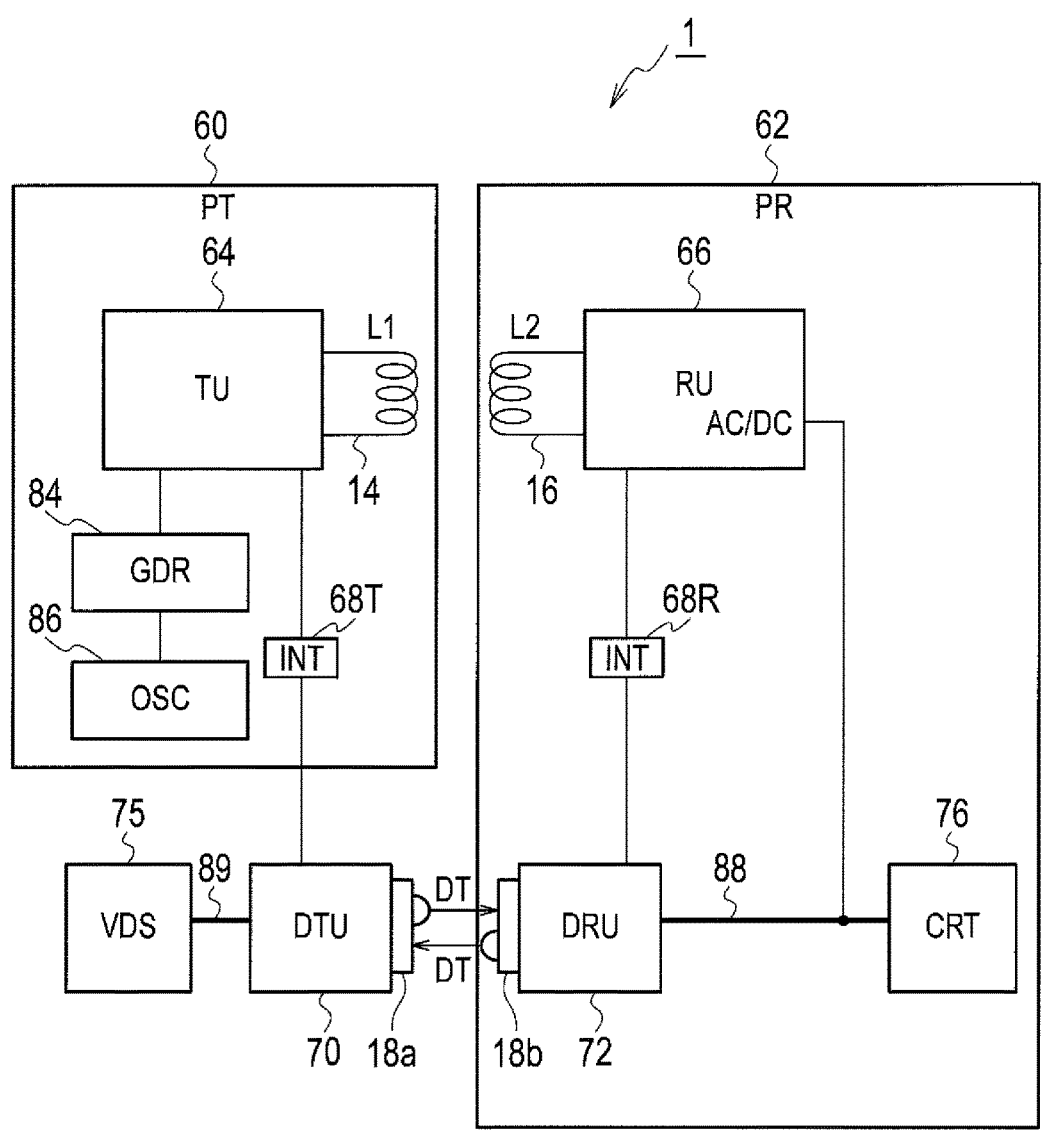
FIG. 31 is still another detailed schematic block configuration diagrams showing the wireless power supply receiver-transmitter device according to the embodiment.

FIG. 31 illustrates still another detailed schematic block configuration of the wireless power supply receiver-transmitter device 1 according to the embodiment. A different point from the block configuration shown in FIG. 29 is a point that the DTU 70 and VDS 75 are placed in the outside of the wireless power supply transmitter (PT) 60. According to such a configuration, it is possible to provide a compact wireless power supply transmitter (PT) 60.

Figure 32:
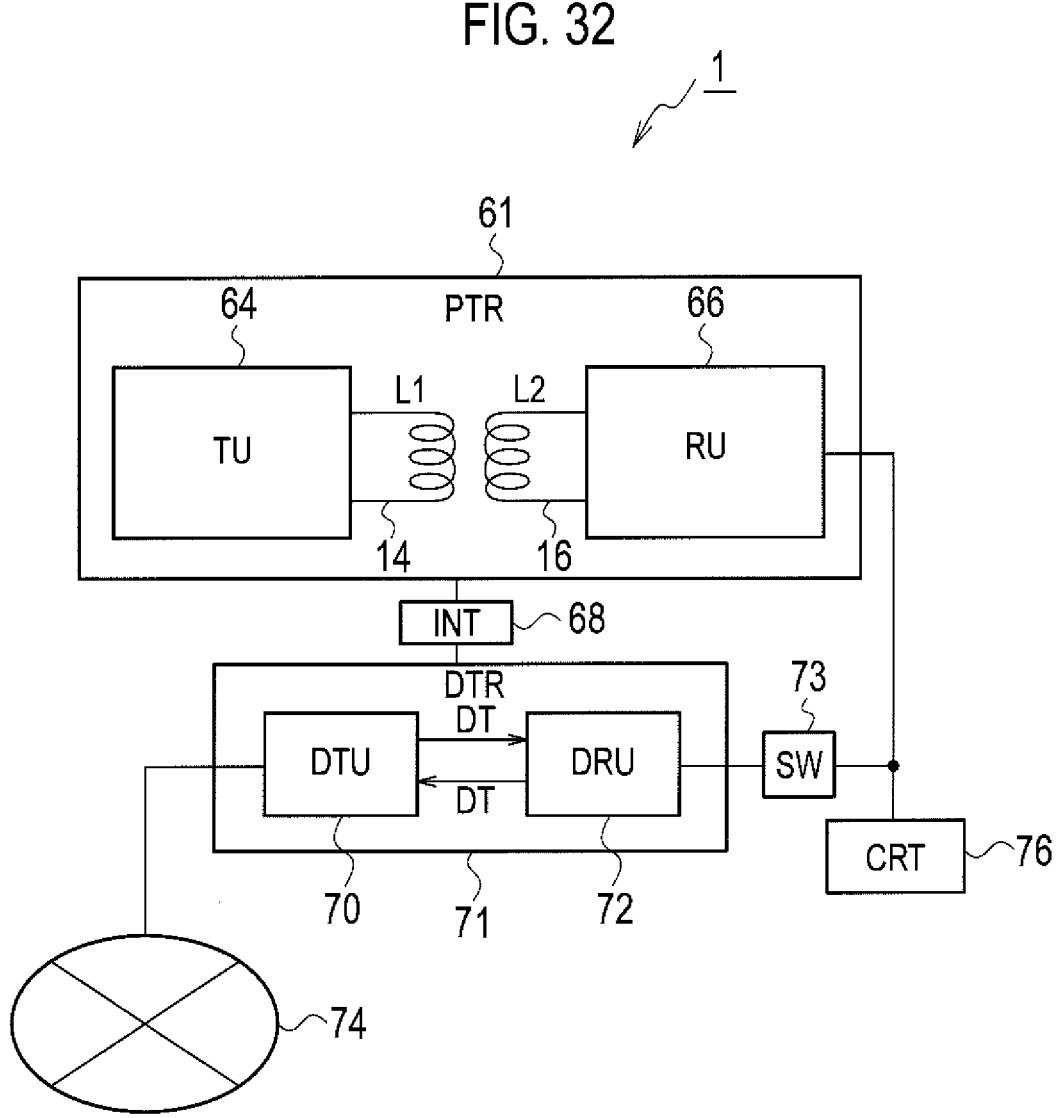
FIG. 32 is still another detailed schematic block configuration diagrams showing the wireless power supply receiver-transmitter device according to the embodiment.

FIG. 32 illustrates still another detailed schematic block configuration of the wireless power supply receiver-transmitter device 1 according to the embodiment. As shown in FIG. 32, a wireless power supply receiver-transmitter unit (PTR) 61 including the TU 64 and the RU 66, and a data transmitter/receiver unit (DTR) 71 including the DTU 70 and the DRU 72 may be connected in parallel to each other via the interface 68. If a switch 73 is disposed between the DRU 72 and the display 76, it is also possible to select using the switch 73 whether or not data is displayed on the display 76. Other points are the same as that shown in FIG. 29.

(Example of Operation)

Figure 33:
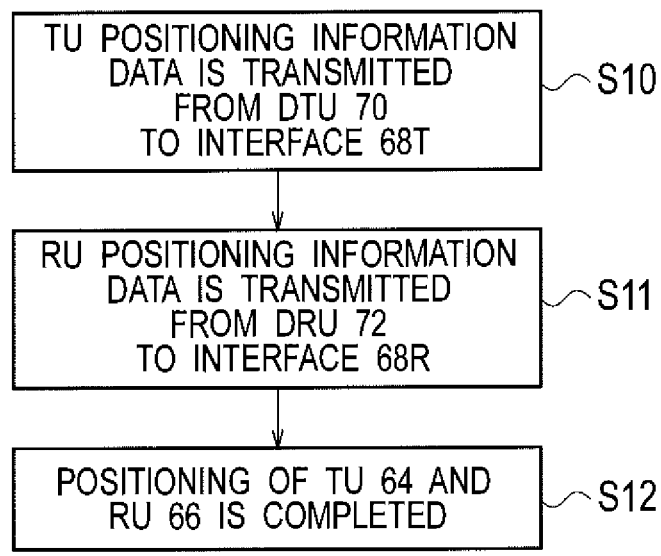
FIG. 33 is a flow chart showing an example of initial operation in the wireless power supply receiver-transmitter device according to the embodiment.

FIG. 33 illustrates a flow chart showing an example of initial operation in the wireless power supply receiver-transmitter device according to the embodiment. As shown in FIG. 33, TU positioning information data is transmitted to the interface 68T from the DTU 70 (S10), and RU positioning information data is transmitted to the interface 68R from the DRU 72 (S11). Accordingly, positioning of the TU 64 and the RU 66 can be completed (S12) on the basis of the TU positioning information data and the RU positioning information data.

Figure 34:
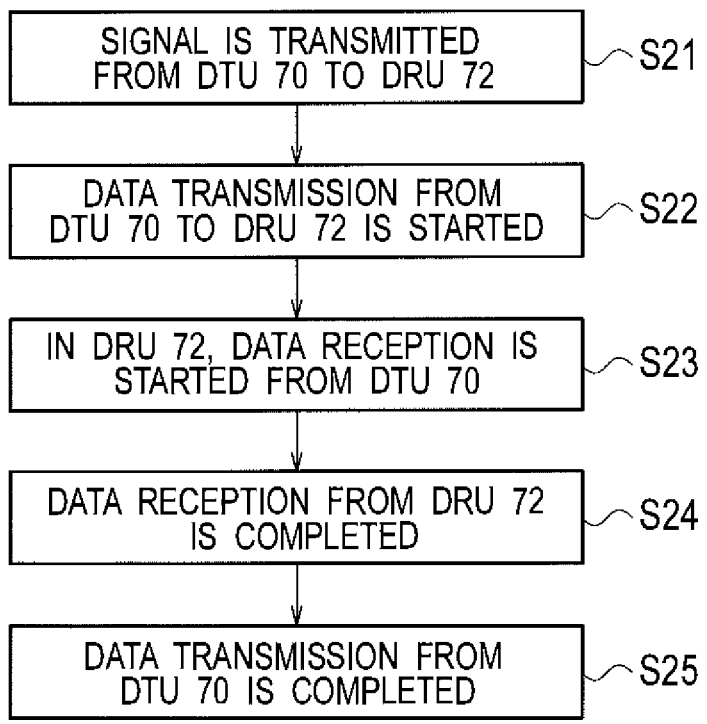
FIG. 34 is a flow chart showing an example of operation in the case of executing a data transmission in the wireless power supply receiver-transmitter device according to the embodiment.

FIG. 34 illustrates a flow chart showing an example of operation of executing the data transmission DT in the wireless power supply receiver-transmitter device according to the embodiment. In this case, it is assumed that positioning of the TU 64 and the RU 66 has already been completed. First, an optical communication start signal is transmitted from the DTU 70 to the DRU 72 (S21). Subsequently, data transmission from the DTU 70 to the DRU 72 is started (S22). In the DRU 72, thereby data reception from the DTU 70 is started (S23). Finally, the data reception from the DRU 72 is completed (S24), and the data transmission from the DTU 70 is completed (S25).

Figure 35:
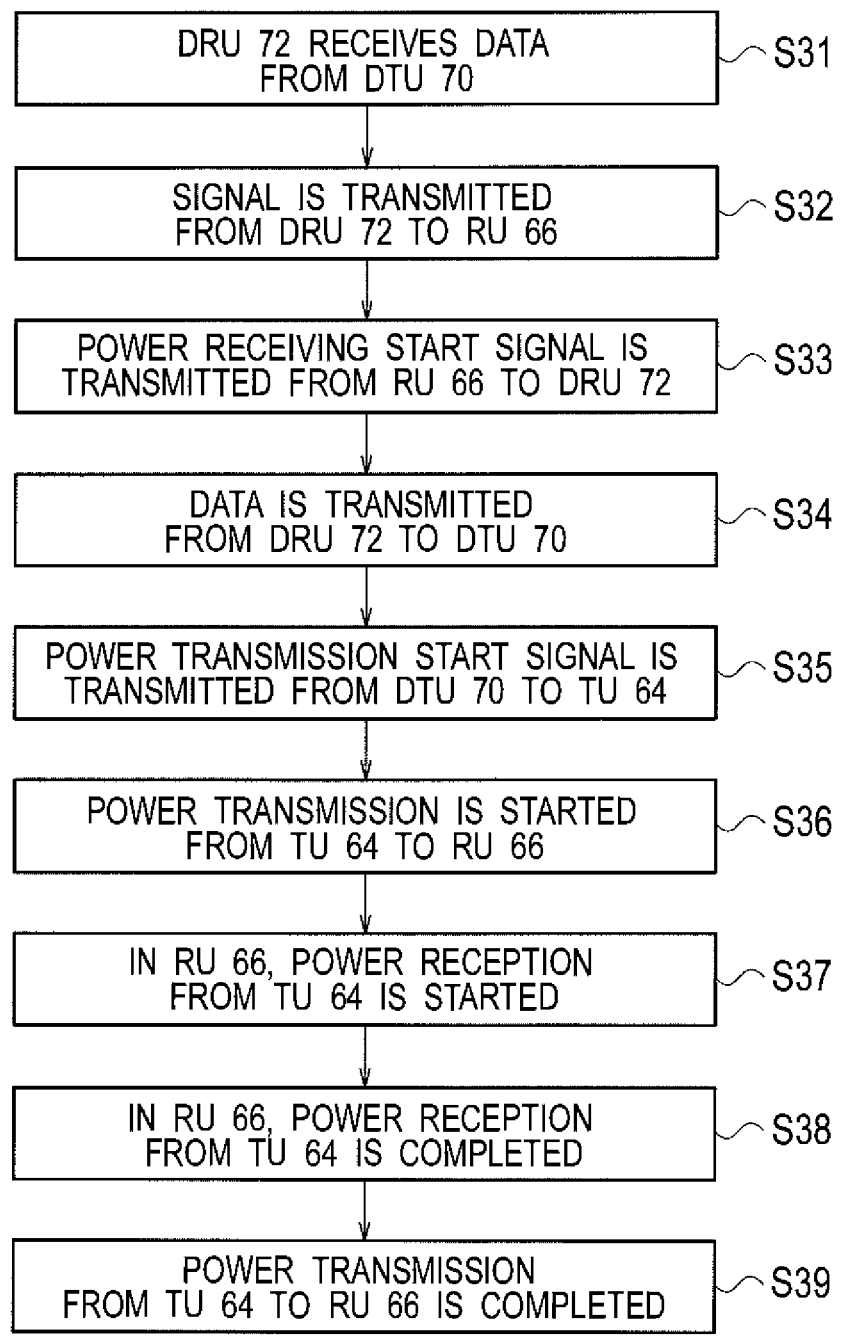
FIG. 35 is a flow chart showing an example of operation in the case of feeding back a state in RU side using a data transmitter/receiver unit in the wireless power supply receiver-transmitter device according to the embodiment.

FIG. 35 illustrates a flow chart showing an example of operation of feeding back a state in the RU 66 side using the data transmitter/receiver unit (DTU 70, DRU 72), in the wireless power supply receiver-transmitter device according to the embodiment. Also in this case, it is assumed that positioning of the TU 64 and the RU 66 has already been completed. First, when the DRU 72 receives data from the DTU 70 (S31), then a signal is transmitted from the DRU 72 to the RU 66 (S32). Subsequently, when a power receiving start signal is transmitted from the RU 66 to the DRU 72 (S33), data is transmitted from the DRU 72 to the DTU 70 (S34). Subsequently, when a power transmission start signal is transmitted from the DTU 70 to the TU 64 (S35), then power transmission is started from the TU 64 to the RU 66 (S36). In the RU 66, thereby, power reception from the TU 64 can be started (S37). Finally, in the RU 66, the power reception from the TU 64 is completed, and then the power transmission from the TU 64 to the RU 66 is completed (S38).

Figure 36:
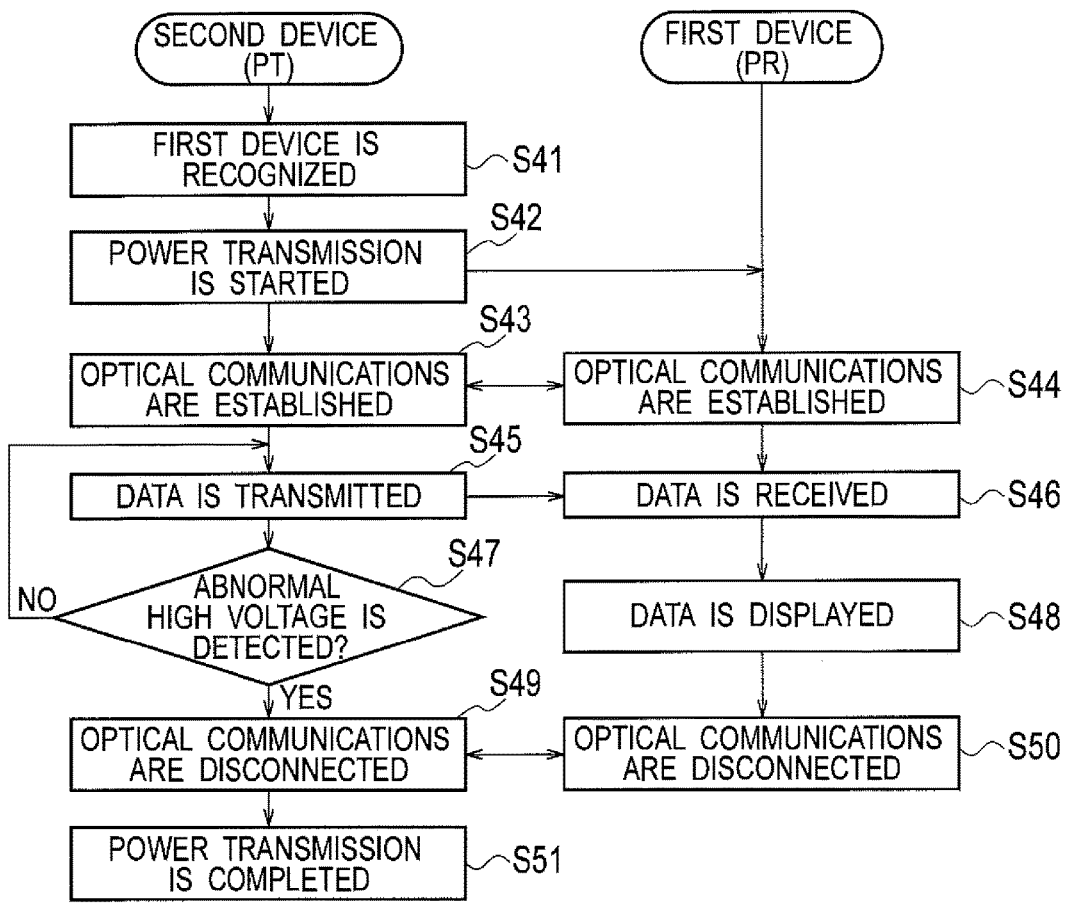
FIG. 36 is a flow chart showing an example of operation in the case of interrupting the data transmission and the power transmission in the wireless power supply receiver-transmitter device according to the embodiment.

FIG. 36 illustrates a flow chart showing an example of operation of interrupting the data transmission DT and the power transmission PT in the wireless power supply receiver-transmitter device according to the embodiment. First, when the wireless power supply transmitter (PT) 60 recognized that the wireless power supply receiver (PR) 62 is in close thereto, the wireless power supply transmitter (PT) 60 starts power transmission toward the wireless power supply receiver (PR) 62 (S41→S42). Subsequently, when optical communications are established between the wireless power supply receiver (PR) 62 and the wireless power supply transmitter (PT) 60, data is transmitted from the wireless power supply transmitter (PT) 60 to the wireless power supply receiver (PR) 62 (S43→S44→S45). Here, if the TU 64 and the RU 66 are displaced from their normal positions during the power transmission, abnormal high voltage may be detected in the TU 64 side. In this case, the wireless power supply transmitter (PT) 60 disconnects the optical communications from/to the wireless power supply receivers (PR) 62, and completes the power transmission to the wireless power supply receiver (PR) 62 (S47→S49→S50→S51).

Figure 37:
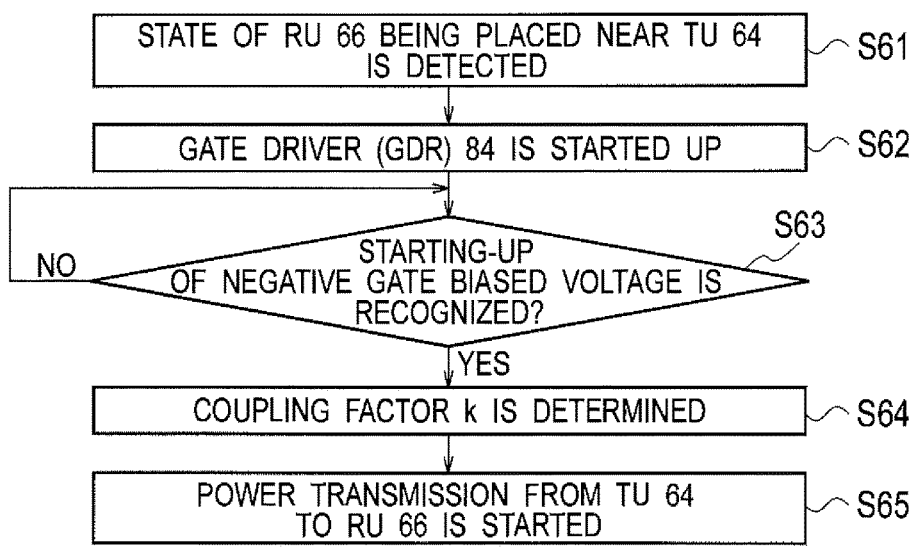
FIG. 37 is a flow chart showing an example of operation of the wireless power supply receiver-transmitter device according to the embodiment in detail.

FIG. 37 illustrates a flow chart showing an example of operation in the wireless power supply receiver-transmitter device according to the embodiment in detail. First, a state that the RU 66 is placed near the TU 64 is detected using switches, e.g. a magnetic switch, an optical switch, etc. (S61). Subsequently, the TU 64 starts the gate driver (GDR) 84 in response to the aforementioned detection signal (S62). If the delay switch is normally ON, electric power is not supplied to the field effect transistors Q1, Q2 until starting-up of negative gate biased voltage from the GDR 84 is recognized (S63: NO). Even if the delay switch is normally OFF, it is preferable to execute the same operation in the case where the negative gate biased voltage is required for securing of OFF characteristics. Then, the TU 64 drives the half bridge circuit so as to execute the power transmission rated at 100%. At this time, a coupling factor with the RU 66 is determined to control a power transmission output, on the basis of a current which flows into the primary-side coil 14/secondary-side coil 16 which executes the power transmission/reception in the power transmitter/power receiver, or a voltage applied on the primary-side coil 14/secondary-side coil 16 (S64). Even if the coupling with the RU 66 is imperfect, or even if the RU 66 is suddenly disconnected therefrom, there can be prevented from generation of an unintended high voltage etc. resulting from the electric power accumulated in the primary-side coil 14 being fed back to the input side of the TU 64. The data transmitter/receiver unit (DTU 70, DRU 72) may be used as a means for feeding back the state in the RU 66 side.

(Protection Function)

FIG. 38 illustrates a protection function for the circuit in the power receiver side, in the wireless power supply receiver-transmitter device according to the embodiment. More specifically, if all the electric power received by the RU 66 is not consumed by a load, an excessive high voltage may be generated in somewhere in the power receiver side. Accordingly, in the present embodiment, there is provided a function for protecting the circuit from such a high voltage.

Figure 38A:
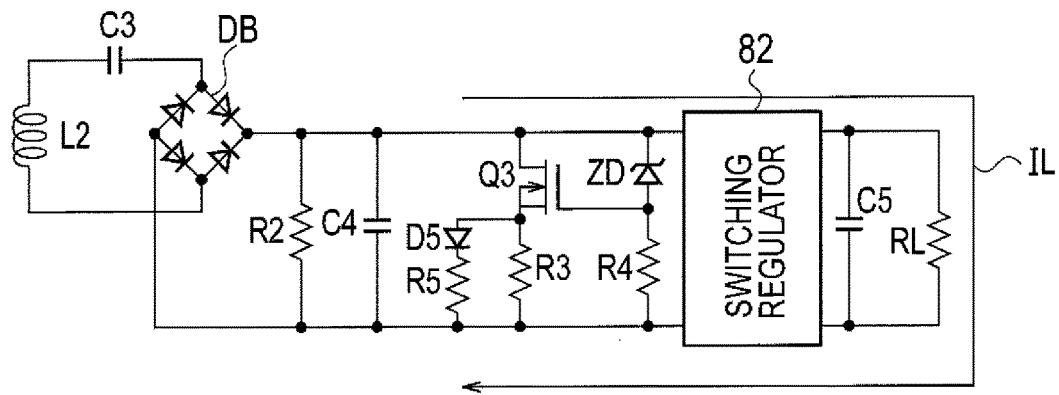
FIG. 38A is a diagram for explaining a protection function in the case of rated load for a circuit in a power receiver side in the wireless power supply receiver-transmitter device according to the embodiment.
Figure 38B:
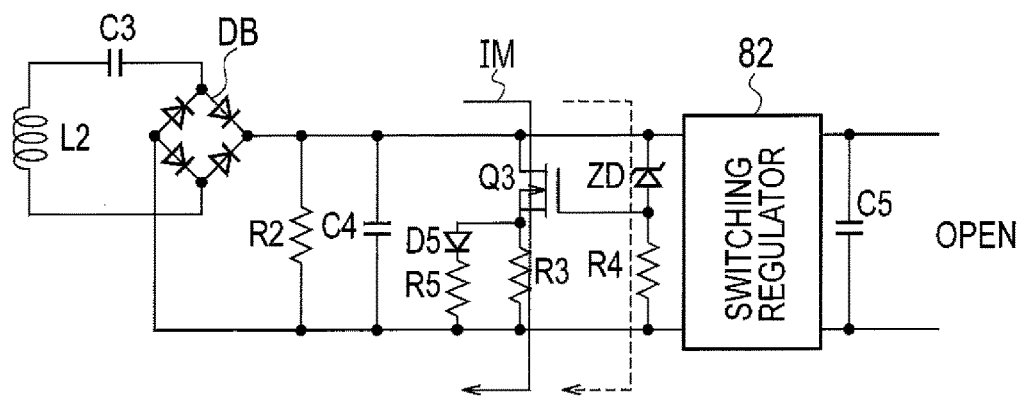
FIG. 38B is a diagram for explaining a protection function in the case of no load for a circuit in a power receiver side in the wireless power supply receiver-transmitter device according to the embodiment.
Figure 38C:
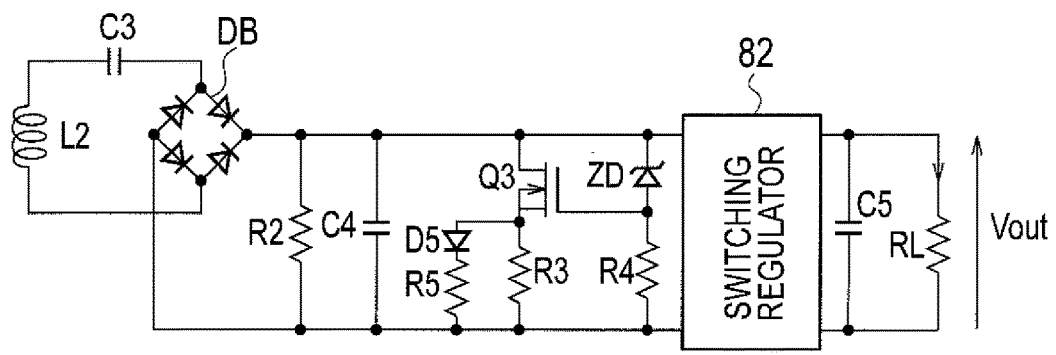
FIG. 38C is a diagram for explaining a protection function in the case of variable load for a circuit in a power receiver side in the wireless power supply receiver-transmitter device according to the embodiment.

First, in the case of rated load, as shown in FIG. 38A, a current IL flows into a resistor RL. Moreover, in the case of no load, as shown in FIG. 38B, a protective transistor Q3 is turned ON, and then current IM flows into a shunt resistor R3. Furthermore, in the case of variable load, as shown in FIG. 38C, a current flows into the resistor RL at the time of the equation "breakdown voltage of the Zener diode ZD+a threshold voltage of the protective transistor Q3<Vout" is realized. More specifically, if excess electric power is generated in the power receiver side, the excess electric power is fed to the resistor to be converted into a heat.

Figure 39:
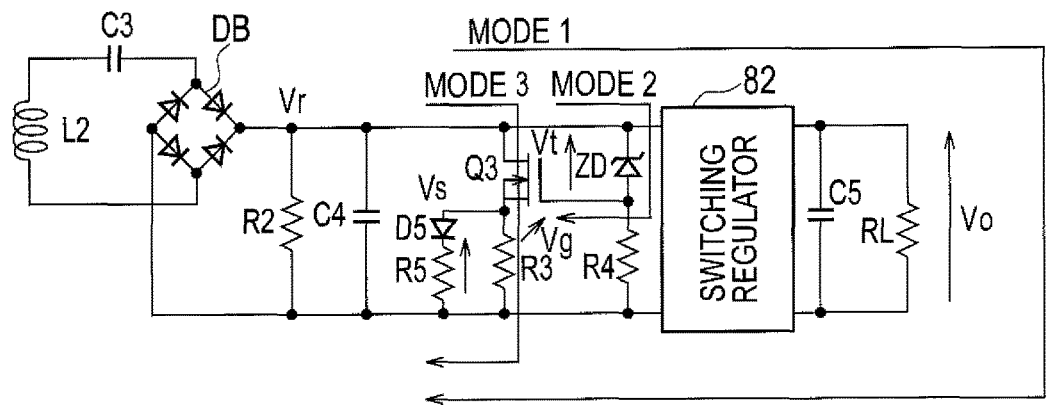
FIG. 39 is a diagram for explaining the protection function for the circuit in the power receiver side in the wireless power supply receiver-transmitter device according to the embodiment in detail.
Figure 40:
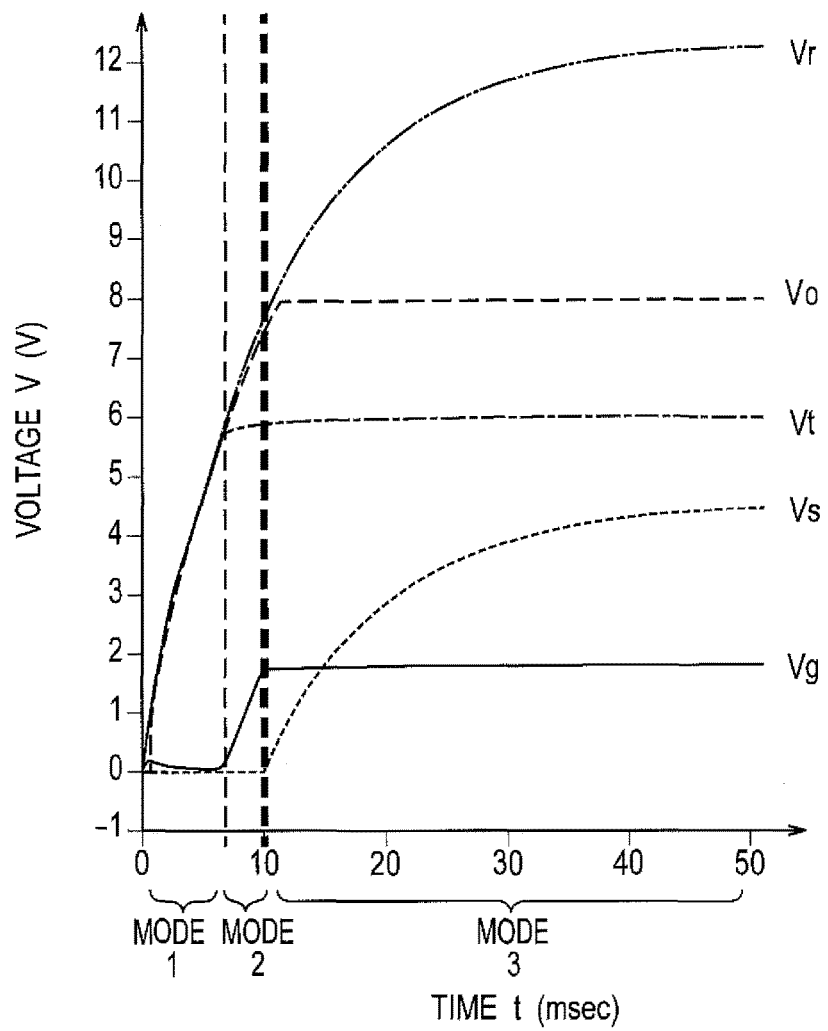
FIG. 40 is a graph showing a simulation result of the protection function for the circuit in the power receiver side in the wireless power supply receiver-transmitter device according to the embodiment.

Such a protection function for the circuit in the power receiver side is illustrated in detail as shown in FIG. 39.

First, a protective transistor Q3 and a Zener diode ZD are disposed at the subsequent stage of the RU 66 to consume the excess electric power (First protection function). The first protection function will now be explained with reference to a simulation result shown in FIG. 40. Vt denotes a reverse breakdown voltage of the Zener diode ZD, Vg denotes a threshold voltage of the protective transistor Q3, and Vo denotes an output of the switching regulator 82 (i.e., set point). Vo is constant value at the time of Vr>Vo. In the mode 1 (Vt>Vr), the voltage is applied only on the load (resistor RL). Moreover, in the mode 2 (Vt+Vg>Vr>=Vt), the Zener diode ZD breaks down, and the voltage is applied on the gate of the protective transistor Q3. Furthermore, in the mode 3 (Vr>=Vt+Vg), the protective transistor Q3 is turned ON, and the voltage Vs is applied on the shunt resistor R3. The equation "Vr−(Vt+Vg)=Vs" is realized.

Next, a second protection function will now be explained. Electric power is wasted by using only the first protection function. Accordingly, a power consumption state in the power receiver side is monitored with a predetermined voltage value (for example, value of the voltage Vo), and the value of the voltage Vo is returned from the power receiver side to the power transmitter side one after another using the optical communication functions. More specifically, the value of the voltage Vo is returned from the DRU 72 to the DTU 70, and then is returned from the DTU 70 to the TU 64 via the interface 68T. Accordingly, when the load requirement power in the power receiver side is reduced, the TU 64 reduces the amount of the power to be transmitted in accordance with the state. On the other hand, when the load requirement power in the power receiver side is increased, the TU 64 increases the amount of the power to be transmitted in accordance with the state. Accordingly, since the amount of the power to be transmitted becomes an amount in according with the power consumption state in the power receiver side, there can be prevented from a high voltage generated in somewhere in the circuits due to an electric power which is not consumed.

As explained above, according to the wireless power supply receiver-transmitter device according to the embodiment, both of the wireless data transmission DT and the wireless power transmission PT can be achieved. Accordingly, it is possible for to provide the connectorless laser link module which was excellent in waterproofness. Moreover, since the communication systems are optical communications, it is possible to provide comfortable and safe communications with higher degree of data transmission rate, excellent also in respect of noise immunity and security.

As explained above, according to the present invention, there can be provided the wireless power supply receiver-transmitter device, the wireless power supply receiver, and the wireless power supply transmitter which allow wireless power supply transmission and wireless data transmission and reception, and improve the usability thereof wirelessly.

Other Embodiments

The present invention has been described by the embodiment, as a disclosure including associated description and drawings to be construed as illustrative, not restrictive. This disclosure makes clear a variety of alternative embodiments, working examples, and operational techniques for those skilled in the art.

Such being the case, the present invention covers a variety of embodiments, whether described or not.

INDUSTRIAL APPLICABILITY

The wireless power supply receiver-transmitter device according to the present invention is applicable to various electric appliances, e.g. mobile devices, and desktop devices. The wireless power supply receiver according to the present invention is applicable to mobile phones, digital still cameras, video cameras, tablet-type devices, electric vehicles, etc., for example. Moreover, the wireless power supply transmitter according to the present invention is applicable to desktop computers, printers, television sets, notebook computers, docking stations, home servers, and plug-in stations for electric vehicle, etc.

What is claimed is:

1. A wireless power supply receiver-transmitter device comprising:
a wireless power supply receiver including a power receiver unit and a first data transmitter/receiver unit;
a wireless power supply transmitter including a power transmitter unit and a second data transmitter/receiver unit; and
a feedback unit configured to detect a state of coupling between the power receiver unit and the power transmitter unit, the feedback unit configured to terminate the power transmission from the power transmitter unit to the power receiver unit and further configured to disconnect data communications between the first data transmitter/receiver unit and the second data transmitter/receiver unit if a voltage higher than a predetermined voltage is detected in the power transmitter unit side, wherein
the power transmitter unit uses a gallium nitride based field effect transistor as a switching device for driving a primary-side coil, wherein
maximum transmitting efficiency $\eta_{max}$ is expressed with the following equation:

$$\eta_{max}=\alpha/[1+(1+\alpha)^{1/2}]^2$$

where $\alpha$ is a coil parameter, and the coil parameter $\alpha$ is equal to or greater than approximately $10^4$;
the wireless power supply receiver wirelessly receives electric power transmitted through a secondary-side coil corresponding to the primary-side coil of the wireless power supply transmitter, and the first data transmitter/receiver unit operates with the electric power transmitted from the wireless power supply transmitter and transmits and receives data bidirectionally to/from the second data transmitter/receiver unit, wherein
the feedback unit is configured to detect the state of coupling between the power receiver unit and the power transmitter unit by determining a coupling factor between the power receiver unit and the power transmitter unit on the basis of at least one of a current flowing into the secondary-side coil and a voltage applied thereon;

wherein the wireless power supply receiver comprises:
a power receiver unit configured to wirelessly receive electric power transmitted from a wireless power supply transmitter, the power receiver unit comprising:
a secondary-side coil;
a secondary-side resonance capacitor connected to the secondary-side coil, the secondary-side resonance capacitor configured to be tuned with the secondary-side coil in a predetermined wireless power transmission carrier frequency band;
a diode bridge circuit connected to the secondary-side resonance capacitor, the diode bridge having a positive output and a negative output;
a first data transmitter/receiver unit configured to bidirectionally transmit and receive data through the optical communications to/from the wireless power supply transmitter, wherein
a regulator circuit configured to output a predetermined voltage used for monitoring a power consumption state in the power receiver unit side;
a protective transistor, a drain of the protective transistor being connected to the positive output of the diode bridge;
a first resistor having a first end connected to a source of the protective transistor and a second end connected to the negative output of the diode bridge;
a Zener diode having a cathode and an anode, the cathode of the Zener diode being connected to the positive output of the diode bridge, and an anode of the Zener diode being connected to the gate of the protective transistor;
a second resistor having a first end connected to the anode of the Zener diode and the gate of the protective transistor and a second end connected to a negative output of the diode bridge.

2. The wireless power supply receiver-transmitter device according to claim 1, wherein
the first data transmitter/receiver unit transmits and receives data bidirectionally to/from the second data transmitter/receiver unit through optical communications.

3. The wireless power supply receiver-transmitter device according to claim 2, wherein
the wireless power supply transmitter transmits image data to be displayed in the wireless power supply receiver from the second data transmitter/receiver unit to the first data transmitter/receiver unit through the optical communications.

4. The wireless power supply receiver-transmitter device according to claim 3, wherein
the image data includes a still image and/or a moving image.

5. The wireless power supply receiver-transmitter device according to claim 3, wherein
the image data is downloaded over the Internet to the first data transmitter/receiver unit through the second data transmitter/receiver unit, wherein
the wireless power supply transmitter is configured to be connected to the Internet.

6. The wireless power supply receiver-transmitter device according to claim 2, wherein
a laser beam in a wavelength region of equal to or greater than 800 nm is used for the optical communications.

7. The wireless power supply receiver-transmitter device according to claim 2, wherein a communication rate of the optical communications is greater than 1 Gbps.

8. The wireless power supply receiver-transmitter device according to claim 2, wherein
the wireless power supply receiver notifies a predetermined voltage value to the wireless power supply transmitter through the optical communications, and the wireless power supply transmitter controls an amount of the power to be transmitted in accordance with the voltage value notified from the wireless power supply receiver.

9. The wireless power supply receiver-transmitter device according to claim 2, wherein
the optical communications is implemented with a transmission through an optical fiber.

10. The wireless power supply receiver-transmitter device according to claim 1, wherein
the wireless power supply receiver is built in one selected from a group consisting of a mobile phone, a digital still camera, a video camera, a tablet-type device, and an electric vehicle.

11. The wireless power supply receiver-transmitter device according to claim 1, wherein
the wireless power supply transmitter is built in one selected from a group consisting of a desktop computer, a printer, a television set, a notebook computer, a docking station, a home server, and a plug-in station for electric vehicles.

12. The wireless power supply receiver-transmitter device according to claim 1, wherein
the first data transmitter/receiver unit and the second data transmitter/receiver unit comprise respectively a laser link module including a laser diode and a photo diode.

13. The wireless power supply receiver-transmitter device according to claim 1, wherein
a switching frequency of the switching device is equal to or greater than 5 MHz.

14. The wireless power supply receiver-transmitter device according to claim 1, wherein
if a coupling state between the power transmitter unit and the power receiver unit is deviated from a certain range of an acceptable working state for transmitting the power supply, the wireless power supply transmitter detects the aforementioned state to terminate the power transmission of electric power.

15. The wireless power supply receiver-transmitter device according to claim 1, wherein
if the wireless power supply receiver receives excess power from the wireless power supply transmitter, the wireless power supply receiver feeds the excess power to a resistor to be converted into a heat.

16. The wireless power supply receiver-transmitter device according to claim 1, wherein
the feedback unit configured to detect the state of the coupling by detecting whether or not the secondary-side coil is displaced from its normal position.

17. The wireless power supply receiver-transmitter device according to claim 1, wherein
the first data transmitter/receiver unit and the second data transmitter/receiver unit respectively configured to function also as the feedback unit.

18. A wireless power supply receiver comprising:
a power receiver unit configured to wirelessly receive electric power transmitted from a wireless power supply transmitter, the power receiver unit comprising:

a secondary-side coil;
a secondary-side resonance capacitor connected to the secondary-side coil, the secondary-side resonance capacitor configured to be tuned with the secondary-side coil in a predetermined wireless power transmission carrier frequency band;
a diode bridge circuit connected to the secondary-side resonance capacitor, the diode bridge having a positive output and a negative output;
a first data transmitter/receiver unit configured to bidirectionally transmit and receive data through the optical communications to/from the wireless power supply transmitter, wherein
a regulator circuit configured to output a predetermined voltage used for monitoring a power consumption state in the power receiver unit side;
a protective transistor, a drain of the protective transistor being connected to the positive output of the diode bridge;
a first resistor having a first end connected to a source of the protective transistor and a second end connected to the negative output of the diode bridge; and
a Zener diode having a cathode and an anode, the cathode of the Zener diode being connected to the positive output of the diode bridge, and an anode of the Zener diode being connected to the gate of the protective transistor;
a second resistor having a first end connected to the anode of the Zener diode and the gate of the protective transistor and a second end connected to a negative output of the diode bridge;
a feedback unit configured to detect a state of coupling between the power receiver unit and a power transmitter unit in the wireless power supply transmitter by determining a coupling factor between the power receiver unit and the power transmitter unit on the basis of at least one of a current flowing into the secondary-side coil and a voltage applied thereon, the feedback unit further configured to terminate the power transmission from the power transmitter unit to the power receiver unit and further configured to disconnect data communications between the first data transmitter/receiver unit and the second data transmitter/receiver unit if a voltage higher than a predetermined voltage is detected in the power transmitter unit side; wherein
the power transmitter unit uses a gallium nitride based field effect transistor as a switching device for driving a primary-side coil, and maximum transmitting efficiency $\eta_{max}$ is expressed with the following equation:

$$\eta_{max} = \alpha/[1+(1+\alpha)^{1/2}]^2$$

where $\alpha$ is a coil parameter, and the coil parameter $\alpha$ is equal to or greater than approximately $10^4$.

19. The wireless power supply receiver according to claim 18, wherein
the first data transmitter/receiver unit notifies a predetermined voltage value to the wireless power supply transmitter.

20. The wireless power supply receiver according to claim 18, wherein
the wireless power supply receiver is built in one selected from a group consisting of a mobile phone, a digital still camera, a video camera, a tablet-type device, and an electric vehicle.

21. The wireless power supply receiver according to claim 18, wherein
the feedback unit configured to detect the state of the coupling by detecting whether or not the secondary-side coil is displaced from its normal position.

22. The wireless power supply receiver according to claim 18, wherein
the first data transmitter/receiver unit and the second data transmitter/receiver unit respectively configured to function also as the feedback unit.

23. A wireless power supply receiver comprising:
a power receiver unit configured to wirelessly receive electric power transmitted from a wireless power supply transmitter, the power receiver unit comprising:
a secondary-side coil;
a secondary-side resonance capacitor connected to the secondary-side coil, the secondary-side resonance capacitor configured to be tuned with the secondary-side coil in a predetermined wireless power transmission carrier frequency band;
a diode bridge circuit connected to the secondary-side resonance capacitor, the diode bridge having a positive output and a negative output;
a first resistor having a first end connected to the positive output of the diode bridge and a second end connected to the negative output of the diode bridge;
a first capacitor having a first end connected to the positive output of the diode bridge and a second end connected to the negative output of the diode bridge;
a first data transmitter/receiver unit configured to bidirectionally transmit and receive data through the optical communications to/from the wireless power supply transmitter, wherein
a regulator circuit configured to output a predetermined voltage used for monitoring a power consumption state in the power receiver unit side;
a resistor disposed between the diode bridge circuit and the regulator circuit, the resistor used for converting excess power into a heat by feeding the excess power thereto if the excess power from the wireless power supply transmitter is received by the wireless power supply receiver; and
a feedback unit configured to detect a state of coupling between the power receiver unit and a power transmitter unit in the wireless power supply transmitter by determining a coupling factor between the power receiver unit and the power transmitter unit on the basis of at least one of a current flowing into the secondary-side coil and a voltage applied thereon, the feedback unit further configured to terminate the power transmission from the power transmitter unit to the power receiver unit and further configured to disconnect data communications between the first data transmitter/receiver unit and the second data transmitter/receiver unit if a voltage higher than a predetermined voltage is detected in the power transmitter unit side; wherein
the power transmitter unit uses a gallium nitride based field effect transistor as a switching device for driving a primary-side coil, and maximum transmitting efficiency $\eta_{max}$ is expressed with the following equation:

$$\eta_{max} = \alpha/[1+\alpha)^{1/2}]^2$$

where $\alpha$ is a coil parameter, and the coil parameter $\alpha$ is equal to or greater than approximately $10^4$.

* * * * *